United States Patent [19]
Shutt

[11] Patent Number: 4,595,414
[45] Date of Patent: Jun. 17, 1986

[54] METHODS FOR PRODUCING FIRE RETARDANT CELLULOSIC PRODUCTS

[76] Inventor: Thomas C. Shutt, 520 Ash St., Denver, Colo. 80220

[21] Appl. No.: 262,540

[22] Filed: May 11, 1981

[51] Int. Cl.$^4$ .............................................. C09K 3/28
[52] U.S. Cl. ................................ 106/18.16; 162/159; 162/181.2
[58] Field of Search ...................... 106/18.16; 162/159, 162/181 A, 181 B

[56] References Cited

U.S. PATENT DOCUMENTS

| | | | |
|---|---|---|---|
| 2,386,471 | 10/1945 | Jones et al. | 167/38.5 |
| 3,120,378 | 12/1964 | Lee et al. | 424/44 |
| 3,220,918 | 11/1965 | Shisko | 162/159 |
| 3,398,019 | 8/1968 | Langguth et al. | 162/159 |
| 3,891,470 | 7/1951 | Kotone et al. | 106/14.05 |
| 4,038,451 | 7/1977 | Brown et al. | 162/159 |
| 4,153,466 | 5/1979 | Smith | 106/15.05 |
| 4,168,175 | 9/1979 | Shutt | 106/15.05 |
| 4,182,681 | 1/1980 | Gumbert | 106/18.16 |

*Primary Examiner*—Lorenzo B. Hayes

[57] ABSTRACT

Fire retardant compositions in pelletized and in aqueous solution form constituting mixtures containing in a ratio by weight about 30-50% monoammonium phosphate and 70-50% diammonium phosphate, and optionally a corrosion inhibitor, which in solution form are of substantially neutral pH and contain in a 10-part ratio by weight about 3-7.9 parts total monoammonium phosphate and diammonium phosphate and 7-2.1 parts of water, and optionally a surfactant;

methods of using such compositions in solution form for providing composite fire retardant cellulosic products in which the solution is intimately intermixed with cellulosic fiber material to form loose fibers thereof containing such solution substantially absorbed therein, e.g. in a 100-part ratio by weight of about 6-16 parts of solution and 94-84 parts of cellulosic material and having a bulk density corresponding to a settled bulk density of about 2.0-3.1 lbs/ft$^3$, optionally with the addition of a finely divided solid supplemental fire retardant material to form corresponding loose fibers of such cellulosic material also containing such supplemental fire retardant material substantially distributed thereon, e.g. in a 100-part ratio by weight of about 6-16 parts of solution, 1-9 parts of supplemental fire retardant material and 93-75 parts of cellulosic material; and composite fire retardant cellulosic products produced thereby.

27 Claims, 1 Drawing Figure

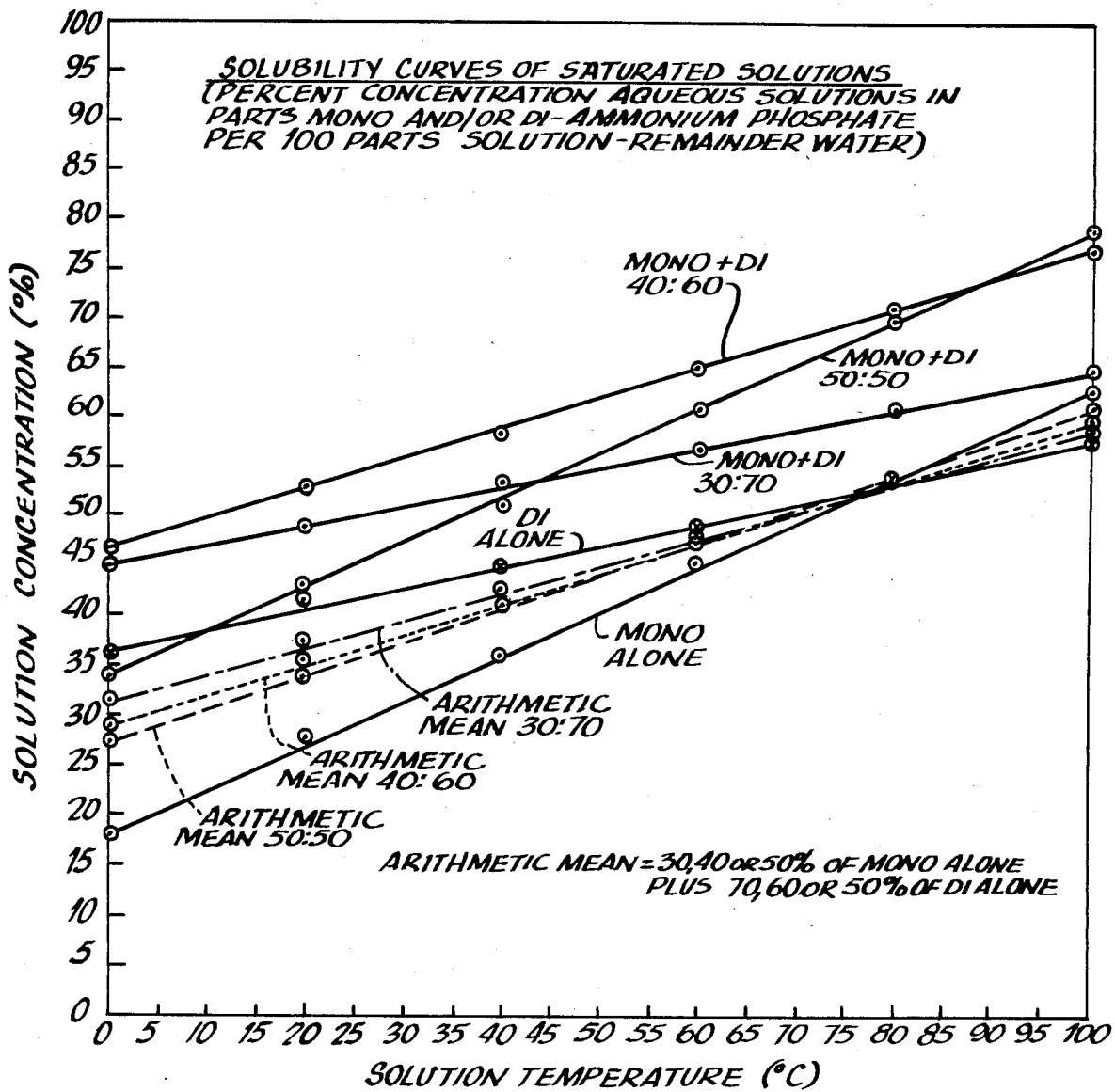

METHODS FOR PRODUCING FIRE RETARDANT CELLULOSIC PRODUCTS

The present invention relates to fire retardant compositions, methods of using such compositions for providing composite fire retardant cellulosic fiber products, and the products thereby produced, and more particularly to the production of cellulosic fiber insulation products which meet government standards and regulations.

Fire retardant materials, compositions and products as contemplated herein, generally concern those substances having both flame retardant and smolder retardant properties, and thus collectively fire retardant properties, or simply fire retardancy.

Cellulosic fiber material insulation products, such as in the form of a loose fill, are widely used for thermal insulation of residential and commercial buildings. Generally, the loose fill material is placed within the exterior walls and/or attic spaces of the structure to serve as a barrier against the transfer of heat therethrough. These insulation products are usually composed of cellulosic fiber material, such as recycled newspaper, cardboard, and the like to which chemical materials are added.

Conventionally, to produce such insulation products, the newspaper or other cellulosic fiber material is fed through a series of hammermills which impart mechanical percussion to the cellulosic material sufficiently to render it finely pulverized and provide it with a low bulk density. The chemical materials are usually added during the pulverizing of the newspaper or other cellulosic material.

The chemical materials are included to provide fire retardant properties as well as other properties to the composite cellulosic fiber material insulation product. In providing these fire retardant properties, the chemical materials added should be selected such that they do not cause corrosion of metal materials or structures with which they come into contact at their end point of use, e.g., at or within the wall of the building in which the insulation material is placed, nor permit fungal growth, or support vermin life, or give off noxious odors, etc.

The type and quantity of the chemical materials added to the cellulosic material will of course determine the various properties of the finished composite loose fill form insulation product. Not only must the final insulation product possess properties sufficient to meet applicable federal regulations, especially as to acceptable fire retardancy, but also the product simultaneously must be commercially viable and competitive as a thermal insulation product from a production cost and production efficiency standpoint.

A current set of federal standards and regulations which must be met by all such insulation products, e.g., as regards fire retardance, settled bulk density, fungal growth, vermin life, noxious odor, etc. properties, is that specified in Federal Specification HHI-515D.

The conventional method of cellulose insulation manufacture contemplates the adding of powdered chemical fire retardant materials, principally borates, to the cellulosic fiber material in amounts ranging from 19–30%, typically 21–23%, and in some cases perhaps even as low as 14–15% depending on the particular chemical material, by weight of the finished composite insulation product, in turn generally providing typically a settled bulk density of 2.8–3.3 lbs/ft$^3$ and a thermal resistance value of approximately 3.5–3.8.

An ideal fire retardant chemical material for use in connection with cellulose or cellulosic fiber material for producing loose fill thermal insulation products would be one in which as small as possible an amount of the fire retardant chemical can be used while providing acceptable fire retardance as well as the other properties mentioned above, and particularly those specified in Federal Specification HHI-515D or other comparable or corresponding governmental standard or regulation. Such a chemical material would permit the obtaining of a final composite cellulosic fiber material loose fill insulation product having a very low bulk density at an acceptable level of fire retardancy, thereby providing high thermal insulation values at comparatively low weight as well as low cost.

Various chemical materials generally known to have fire retardant properties and instances of the incorporation of particular formulations of certain fire retardant chemical materials in cellulosic fiber materials, including the production of typical loose fiber type composite fire retardant cellulosic insulation products, are set forth in the following prior art.

For instance, U.S. Pat. No. 4,168,175 to Shutt (applicant herein) discloses certain fire retardant generally non-caking compositions of intimately intermixed ammonium phosphate, e.g. mono and/or diammonium phosphate, sodium tetraborate containing molecularly bound water, and fractured finely ground solid powder particles of soda-containing silicate glass of specific characteristics for maintaining the phosphate and tetraborate particles in moisture protected disposition and for inhibiting the tendency of such particles to adhere to one another, such that the resulting admixture is substantially dry and free flowing, with the individual particles thereof in substantially uniform and non-caking distribution. These compositions are combined with fibers of cellulosic material to form flame retardant or fire retardant products in which the individual dry particles of glass, tetraborate and phosphate are disposed in situ in entwined relation with the adjacent dry cellulosic fibers of the resultant loose fill fiber product.

U.S. Pat. No. 2,225,831 to Herz concerns a dilute aqueous fire proofing solution of borax, ammonium phosphate and ammonium chloride for impregnating various materias. The particular ammonium phosphate contemplated is not identified. However, it is believed that such composition by reason of its very nature will lead eventually to objectionable ammonia release and formation of ammonium borophosphate which will detract from the fire proofing effect desired.

U.S. Pat. No. 2,386,471 to Jones et al discloses a similar liquid impregnating system including monoammonium or diammonium phosphate, ammonia, copper sulfate and a wetting agent, usable as a dilute aqueous solution for fireproofing the wood of frame dwelling interiors. When monoammonium phosphate is used, enough additional ammonia should be used to convert this to diammonium phosphate.

U.S. Pat. No. 2,542,721 to Stafford discloses a liquid asphalt paint coating for waterproofing and fire retarding the roof of a building, in which besides an organic solvent for the asphalt, zinc borate, asbestos fibers and expanded perlite cellular granules of crude volcanic glass are provided. However, no ammonium phosphate component is contemplated in the liquid paint coating.

Abstract 61,695 (649 O.G. 603, published August 14, 1951) to Little discloses coating or impregnating cellulosic or other inflammable materials with equal parts by weight of diammonium phosphate and borate or sodium tetraborate decahydrate, apparently liquid carrier or solvent, to reduce fire hazards. The composition is applied by conventional immersion, spraying or brushing, or by impregnation in a suitable washer. It is believed this composition will suffer from the same objections as noted above for the composition of U.S. Pat. No. 2,225,831 to Herz.

U.S. Pat. No. 3,082,121 to Donaldson et al concerns the treatment of carpets produced from cellulose acetate fibers and yarns to impart flame retardant properties thereto, and indicates that many water soluble materials such as sodium tetraborate, sodium phosphate, ammonium phosphate, ammonium sulfamate, sodium carbonate, potassium carbonate, and many others, have not been found to be effective in flameproofing cellulose acetate carpets. The particular ammonium phosphate contemplated is not identified.

U.S. Pat. No. 3,996,325 to Megraw concerns the use of known aqueous solutions for rendering various materials including cellulosic materials fire retardant in selectively localized strata incorporated into a composite particleboard. Among the known fire retardant materials mentioned as usable therein are hydrated borax, diammonium phosphate, various of the hydrated borates, boric acid, ammonium sulfate, ammonium phosphate (which is not specifically further identified), dicyanodiamidephosphoric acid, zinc chloride tetrakis (hydroxymethyl) phosphonium chloride and combinations thereof and other materials.

Thus, particular solutions of hydrated borax or other borate, or of monoammonium phosphate, or of diammonium phosphate, or various specific combinations thereof have been used heretofore in specific formulations and by way of particular procedures for fire retarding cellulosic material.

However, in the case of the use of liquid chemical fire retardant materials, the problem persists that because of the general solubility limitations in water at ambient temperature of monoammonium phosphate and of diammonium phosphate, a sufficient concentration specifically of the corresponding ammonium phosphate in water cannot be achieved for impregnating cellulosic fiber material therewith so as to provide the desired content of ammonium phosphate therein as the sole impregnated fire retardant chemical, e.g. to meet current governmental standards and regulations, without unduly saturating the cellulosic material with an unwanted high attendant water content and thereby adversely affecting the loose fill condition of the fibers and the concomitant bulk density thereof.

More specifically, where excess dilute ammonium phosphate solution is used as liquid chemical to impregnate the cellulosic fiber material in order to provide sufficient fire retardant levels of ammonium phosphate therein, an objectionably damp, soggy mass is produced, and where insufficient ammonium phosphate solution is used as liquid chemical to avoid producing such a damp soggy mass, the fire retardant levels sought are per se unattainable.

Furthermore, where diammonium phosphate solution is used in the usual instance as liquid chemical to impregnate cellulosic material, objectionable ammonia release gradually occurs in due course because of the relatively unstable nature of this substance. Thus, a disadvantage of conventional diammonium phosphate impregnated fibers of cellulosic material, for example when used as a loose fiber fill insulation material at or between the walls and/or in the attic spaces of homes and other buildings, is the development of noxious and objectionable odors caused by such ammonia release with the passage of time. Also, since diammonium phosphate, (NH4) 2 HP04, is slightly alkaline in pH, e.g. about 8.2 to 8.4 pH, it also constitutes to some degree a potential source of corrosion of metal materials, and especially copper, with which it may come into contact when contained in free form in such insulation material, especially in the presence of ambient moisture.

In contrast thereto, monoammonium phosphate, NH4H2P04, is substantially acidic in pH, e.g. about 3.0-4.0 pH, yet its solubility in water is generally much lower than that of diammonium phosphate. Consequently, its use as a liquid chemical fire retardant impregnant is limited to more or less highly dilute solutions, and the above discussed problems as to excessive dampness of the product, low levels of fire retardancy, and the like, are even more pronounced than in the case of diammonium phosphate solutions.

For these various reasons, generally more costly finely divided solids are used as powdered chemical fire retardant materials instead of corresponding liquid chemical materials, as these may be added to the cellulosic fiber material without the need for attendant water. However, although the problems of dampness and attainment of generally insufficient fire retardant levels associated with the use of liquid chemicals as noted above are avoided, the use of powdered chemicals normally results in unnecessarily high chemical loading of the fibers and commercially unattractive high bulk densities for the loose fiber product in order to meet such governmental standards and regulations.

It is among the objects and advantages of the present invention to overcome the drawbacks and deficiencies of the prior art, and to provide fire retardant compositions of inexpensive source chemical fire retardant materials in pelletized and in aqueous solution form, constituting mixtures containing in a ratio by weight about 30-50% monoammonium phosphate and 70-50% diammonium phosphate, and optionally a corrosion inhibitor, and which in aqueous solution form have a concentration of at least about 30% by weight up to a saturated solution at the corresponding temperature of the solution, and are preferably of substantially neutral pH and contain in a 10-part ratio by weight about 3-7.9 parts total monoammonium phosphate and diammonium phosphate and 7-2.1 parts of water, and optionally a surfactant.

It is among the additional objects and advantages of the present invention to provide fire retardant compositions of the foregoing type containing a specific monoammonium phosphate and diammonium phosphate ratio relationship fire retardant chemical system which provides generally higher concentration aqueous solutions at any given temperature than those of the individual ammonium phosphate components alone, and which simultaneously substantially inhibits ammonia release therefrom and is not corrosive to metal materials.

It is among the further objects and advantages of the present invention to provide methods of using such fire retardant compositions of the foregoing type, in solution form having a concentration of from at least about 30% by weight up to a saturated solution for providing final loose fill type composite fire retardant cellulosic fiber insulation products, in which the solution as liquid chemical is intimately intermixed with cellulosic fiber material to form loose fibers thereof containing such solution substantially absorbed therein, e.g. in a 100-part ratio by weight of about 6–16 parts of solution and 94–84 parts of cellulosic fiber material and having a low bulk density corresponding to a settled bulk density of only about 2.0–3.1 lbs/ft$^3$.

It is among the further objects and advantages of the present invention to provide methods of the foregoing type with the optional addition of an enriching or supplemental amount of a finely divided solid supplemental fire retardant material as powdered chemical to form corresponding loose fibers of such cellulosic material also containing such supplemental fire retardant material substantially distributed thereon, e.g. in a 100-part ratio by weight of about 6–16 parts of the solution as liquid chemical, 1–9 parts of the supplemental fire retardant material as powdered chemical and 93–75 parts of cellulosic fiber material, and having a low such settled bulk density of only about 2.0–3.1 lbs/ft$^3$, and more particularly to the optional inclusion of such powdered chemical only when and to the enriching extent necessary to overcome any deficiency in the amount of the liquid chemical present in the final product consequent inefficient production system conditions, and in turn provide a total fire retardant chemical content therein sufficient to meet applicable governmental standards and regulations.

It is among the further objects and advantages of the present invention to provide inexpensive composite fire retardant cellulosic products produced in accordance with the foregoing methods, and particularly while using lower amounts of fire retardant materials and achieving lower bulk densities at less cost than heretofore and at the same time meeting such governmental standards and regulations.

It is among the further objects and advantages of the present invention to provide a specific monoammonium phosphate and diammonium phosphate ratio relationship fire retardant chemical system for use in connection with cellulosic fiber material for producing corresponding insulation products, e.g. of the loose fill type, in which the lowest possible amount thereof is included as necessary to meet applicable governmental standards and regulations and/or which possess acceptable levels of fire retardancy at relatively very low bulk density and correspondingly high thermal insulation values and low cost, while avoiding potential ammonia release therefrom and/or corrosion of metal materials thereby, and furthermore to provide an overall economical and efficient method contemplating alternative features for attaining such insulation products.

Other and further objects and advantages of the present invention will become apparent from a study of the within specification and accompanying drawing, in which:

the FIGURE shown is a graph of solubility curves of saturated aqueous solutions illustrating the solubility properties of specific mixtures contemplated by the present invention.

In accordance with one main aspect of the present invention, a fire retardant composition is provided which comprises a water-compatible intimate and uniform fire retardant mixture substantially free from water-insoluble ingredients and from alkali as well as from alkaline earths and having a substantially neutral pH in aqueous solution form, and containing in a ratio by weight substantially between about 30–50% monoammonium phosphate and 70–50% diammonium phosphate and at most up to about 2% free acid such as free mineral acid.

Advantageously, in accordance with one feature of this one main aspect of the present invention, the fire retardant composition consists essentially of a water-compatible intimate and uniform fire retardant mixture substantially free from water-insoluble ingredients and from both alkali and alkaline earths and having a substantially neutral pH in aqueous solution form; and containing in a ratio by weight substantially between about 30–50% mono and 70–50% diammonium phosphate and at most up to about 2% free acid such as free mineral acid, especially free orthophosphoric acid and/or free sulfuric acid, said mixture being composed of finely divided particles in compacted composite solid pelletized article dosage form.

Preferably, the solid form mixture additionally contains an effective amount of a conventional corrosion inhibitor, e.g. present in an amount by weight of substantially between about 0.05–0.3 part per part total monoammonium and diammonium phosphate present in the mixture.

More particularly, the solid-form mixture contains in a ratio by weight substantially between about 35–50% monoammonium phosphate and 65–50% diammonium phosphate; more preferably substantially between about 40–50% mono and 60–50% di; and most preferably substantially about 35–45%, and especially 40%, monoammonium and 65–55%, and especially 60%, diammonium phosphate.

Advantageously, in accordance with another feature of this one main aspect of the present invention, the fire retardant composition consists essentially of a water-compatible intimate and uniform fire retardant mixture substantially free from water-insoluble ingredients and from both alkali and alkaline earths and containing in a ratio by weight substantially between about 30–50% monoammonium and 70–50% diammonium phosphate and at most up to about 2% free acid such as free mineral acid, especially free orthophosphoric acid and/or free sulfuric acid, said mixture being a homogenous mixture in the form of an aqueous solution of substantially neutral pH, containing in a 10 part ratio by weight substantially between about 3–7.9 or 3–7 parts total mono and diammonium phosphate and 7–2.1 or 7–3 parts of water, and having a concentration of from at least about 30% by weight up to a saturated solution at the corresponding temperature of the solution.

Preferably, the solution form mixture likewise additionally contains an effective amount of a corrosion inhibitor, e.g. present in an amount by weight of substantially between about 0.05–0.3 part per part total mono and diammonium phosphate present in the solution, i.e. substantially between about 5–30% by weight based on the total monoammonium and diammonium phosphate in the aqueous solution.

Optionally, yet preferably, the solution form mixture additionally contains an effective amount of a conventional wetting agent or surfactant, e.g. a trace amount thereof, such as substantially between about 0.1–1% by weight thereof based on the aqueous solution.

More particularly, the solution form mixture contains in a ratio by weight preferably substantially between about 35–50% mono and 65–50% di; more preferably substantially between about 40–50% mono and 60–50% di; and most preferably substantially about 35–45%, and especially 40%, mono and 65-55%, and especially 60%, diammonium phosphate, and correspondingly has a concentration of from at least about 30% by weight up to a saturated aqueous solution at the corresponding temperature of the solution.

More specifically, the solution form mixture preferably contains in a ratio by weight substantially between 40-50% monoammonium and 60-50% diammonium phosphate, and in a 10 part ratio by weight substantially between about 3.8-5.7 parts total monoammonium and diammonium phosphate and 6.2-4.3 parts of water, e.g. at about room temperature. Most preferably, the solution form mixture contains in a ratio by weight substantially about 35-45%, and especially 40%, monoammonium and 65-55%, and especially 60%, diammonium phosphate, and in a 10 part ratio by weight substantially about 5-5.5 or 5 parts total mono and diammonium phosphate and 5-4.5 or 5 parts of water, e.g. at about room temperature, i.e. substantially about 4 parts monoammonium and 6 parts diammonium phosphate and 10 parts water, thereby forming a substantially 50%, or roughly 50-55%, by weight aqueous solution.

In accordance with a further main aspect of the present invention, a method of using a fire retardant composition of the foregoing type for providing an improved composite fire retardant cellulosic product is provided.

Advantageously, in accordance with one feature of this further main aspect of the present invention, the method of using the fire retardant composition comprises dissolving the compacted solid pelletized article dosage form mixture in sufficient water to provide such mixture as a homogenous mixture in the form of an aqueous solution of substantially neutral pH, containing in a 10 part ratio by weight substantially between about 3-7.9 or 3-7, and preferably 3.8-5.7, parts total monoammonium and diammonium phosphate and 7-2.1 or 7-3, and correspondingly preferably 6.2-4.3, parts of water, and then substantially contacting and intimately intermixing such aqueous solution as liquid chemical with cellulosic fiber material sufficiently to form loose fibers of such cellulosic material containing such solution substantially absorbed therein or impregnated therewith.

Preferably, the solution is intermixed as liquid chemical with the cellulosic material in a 100 part ratio by weight of substantially between about 6-16 parts of such solution and 94-84 parts of such cellulosic fiber material. Favorably, the intermixing includes pulverizing the cellulosic fiber material in contact with the solution sufficiently to provide the resultant intermixture with a low bulk density corresponding to a settled bulk density of substantially between about 2.0-3.1, and preferably 2.4-2.7, lbs/ft$^3$.

The solid form mixture used in this regard preferably contains in a ratio by weight substantially between about 40-50% mono and 60-50% diammonium phosphate, and is dissolved in sufficient water to provide such mixture as a homogenous mixture in the form of an aqueous solution as liquid chemical of substantially neutral pH, and preferably containing in a 10 part ratio by weight substantially between about 3.8-5.7 parts total monoammonium and diammonium phosphate and 6.2-4.3 parts of water.

Desirably, the resulting solution preferably additionally contains an effective amount of the corrosion inhibitor, and the intermixing includes the optional step of adding an enriching additive amount of a finely divided solid supplemental fire retardant material as powdered chemical sufficiently to form loose fibers of such cellulosic material containing such solution substantially absorbed therein and such fire retardant material substantially distributed thereon. Moreover, the solution, cellulosic fiber material and supplemental fire retardant material are intermixed, preferably in a 100 part ratio by weight of substantially between about 6-16 parts of such solution, 1-9 parts of such supplemental fire retardant material and 93-75 parts of such cellulosic material, and favorably the intermixing includes pulverizing the cellulosic fiber material in contact with the solution as liquid chemical and in contact with the supplemental fire retardant material as powdered chemical sufficiently to provide the resultant intermixture with a low bulk density corresponding to such settled bulk density of substantially between about 2.0-3.1, and preferably 2.4-2.7, lbs/ft$^3$.

Advantageously, in accordance with another feature of this further main aspect of the present invention, the method of using the fire retardant composition comprises substantially contacting and intimately intermixing the solution form mixture as liquid chemical with cellulosic fiber material sufficiently to form loose fibers of such cellulosic material containing such solution substantially absorbed therein or impregnated therewith.

In this instance as well, preferably the solution form mixture is intermixed with the cellulosic fiber material in a 100 part ratio by weight of substantially between about 6-16 parts of such solution and 94-84 parts of such cellulosic fiber material, and favorably the intermixing includes pulverizing the cellulosic fiber material in contact with the solution sufficiently to provide the resultant intermixture with a low bulk density corresponding to such settled bulk density of substantially between about 2.0-3.1, and preferably 2.4-2.7, lbs/ft$^3$.

Likewise, the solution form mixture used in this regard is of substantially neutral pH and preferably contains in a ratio by weight substantially between about 40-50% mono and 60-50% diammonium phosphate, and more preferably contains in a 10 part ratio by weight substantially between about 3.8-5.7 parts total monoammonium and diammonium phosphate and 6.2-4.3 parts of water.

In the same way, desirably the solution form mixture preferably additionally contains an effective amount of the corrosion inhibitor, and the intermixing includes the optional step of adding an enriching additive amount of a finely divided solid supplemental fire retardant material as powdered chemical sufficiently to form loose fibers of such cellulosic fiber material containing such solution substantially absorbed therein and such fire retardant material substantially distributed thereon. Correspondingly, the solution, cellulosic fiber material and supplemental fire retardant material are intermixed preferably in a 100 part ratio by weight of substantially between about 6-16 parts of such solution, 1-9 parts of such supplemental fire retardant material and 93-75 parts of such cellulosic fiber material, and similarly favorably the intermixing includes pulverizing the cellulosic fiber material in contact with the solution and in contact with the supplemental fire retardant material sufficiently to provide the resultant intermixture with a low bulk density corresponding to such settled bulk density of substantially between about 2.0-3.1, and preferably 2.4-2.7 lbs/ft$^3$.

Notwithstanding the foregoing, it will be appreciated that the present invention independently broadly contemplates a method for providing an improved composite fire retardant cellulosic product, comprising substantially intimately intermixing a specific fire retardant chemical system as liquid chemical, constituting an aqueous solution from any source, containing in a ratio by weight substantially between about 30-50%, preferably 35-50%, more preferably 40-50% and most preferably 35-45%, and especially 40%, monoammonium and 70-50%, preferably 35-50%, more preferably 40-50% and most preferably 65-55%, and especially 40%, diammonium phosphate, and having a concentration of from at least about 30% by weight up to a saturated solution at the corresponding temperature of the solution, with cellulosic fiber material sufficiently to form loose fibers of such cellulosic material containing such solution substantially absorbed therein or impregnated therewith.

In this regard, preferably the solution is of substantially neutral pH and/or contains an effective amount of a corrosion inhibitor and/or contains an effective amount of a surfactant. In particular, the solution preferably contains in a ratio by weight substantially between about 40-50% monoammonium and 60-50% diammonium phosphate, and in a 10 part ratio by weight substantially between about 3.8-5.7 parts total monoammonium and diammonium phosphate and 6.2-4.3 parts of water, e.g. at about room temperature.

The presently most preferred embodiment of the solution used as liquid chemical for the intermixing is one which contains in a ratio by weight substantially about 35-45%, and especially 40%, monoammonium and 65-55%, and especially 60%, diammonium phosphate, and in a 10 part ratio by weight substantially about 5-5.5 or 5 parts total monoammonium and diammonium phosphate and 5-4.5 or 5 parts of water, i.e. substantially about 4 parts monoammonium and 6 parts diammonium phosphate and 10 parts water, thereby forming a substantially 50%, or roughly 50-55%, by weight aqueous solution.

Suitably, the intermixing as broadly contemplated is carried out at least in part in the presence of an air current flow, which optionally yet preferably includes at least in part a flow of hot air sufficient for selectively removing excess attendant moisture corresponding to a portion of the water content of the solution present in those cases where such excess moisture removal or water loss is desired.

Generally, the intermixing as broadly contemplated favorably includes pulverizing the cellulosic fiber material in contact with the solution as liquid chemical sufficiently to provide the resultant intermixture with a low bulk density corresponding to such settled bulk density as aforesaid. Moreover, the solution is intermixed with the cellulosic fiber material advantageously preferably in such 100 part ratio by weight as aforesaid.

Desirably, the intermixing as broadly contemplated includes the optional step of adding an enriching additive amount of a finely divided solid supplemental fire retardant material as powdered chemical sufficiently to form loose fibers of such cellulosic material containing the solution substantially absorbed therein and the supplemental fire retardant material substantially distributed thereon. Advantageously, the solution, cellulose fiber material and supplemental fire retardant material are intermixed preferably in such 100 part ratio by weight as aforesaid. Favorably, in this regard, the solution is of substantially neutral pH and additionally contains a corrosion inhibitor, the intermixing is carried out at least in part in the presence of an air current, and the intermixing includes pulverizing the cellulosic fiber material in contact with the solution as liquid chemical and in contact with the supplemental fire retardant material as powdered chemical sufficiently to provide the resultant intermixture with a low bulk density corresponding to such settled bulk density as aforesaid.

In accordance with a still further main aspect of the present invention, corresponding improved composite fire retardant cellulosic products possessing the foregoing features and corresponding inherent properties, especially comparatively low bulk densities and corresponding settled bulk densities, are provided in consequence of the various method aspects of the present invention as noted above.

MATERIALS, EQUIPMENT AND PRODUCTS

The monoammonium phosphate, i.e. monobasic ammonium phosphate, $NH_4H_2PO_4$, and diammonium phosphate, i.e. dibasic ammonium phosphate, $(NH_4)_2HPO_4$, may each be obtained from any appropriate source such as commercial or agricultural grade, and thus advantageously low cost, monoammonium phosphate and diammonium phosphate. This grade may contain up to at most about 2% by weight of free acid, e.g. orthophosphoric acid and/or sulfuric acid, or other mineral acid, but this will not adversely affect the integrity of the particular corresponding ammonium phosphate or its performance in connection with the various aspects of the present invention.

For providing the compacted solid pelletized article dosage form mixture, the monoammonium phosphate and diammonium phosphate are preferably combined into an intimate mixture, i.e. in the stated ratio relationship, as finely divided solid particles having an average particle size at least below about 4 mesh (e.g. below about 3.30mm) for suitable acceptable operation, although much smaller particle sizes, e.g. below about 200 mesh (i.e. below about 0.074 mm) or even below about 325 mesh (i.e. below about 0.044 mm), are preferred for enhanced results.

The mixture is compacted under mechanical molding pressure generally in excess of about 2,000 psi to form the composite solid pelletized article, e.g. of tablet size, coal size, lozenge size, briquette size, etc., and preferably a generally almond shaped and sized pellet or tablet, facilitating the transporting, handling, dosaging and general use of the mixture.

The resultant solution to be used as liquid chemical for the intermixing with the cellulosic fiber material will normally have a substantially neutral pH. This is typically about 6.8 pH using agricultural grade monoammonium phosphate and diammonium phosphate, e.g. in a weight ratio of about 40% monoammonium to 60% diammonium phosphate, due to the presence of residual free acid such as orthophosphoric acid and/or sulfuric acid as commercial impurities therein along with the pertinent amounts of monoammonium and diammonium phosphate.

Under certain conditions of use, such free acids and/or the supplemental fire retardant material optionally included as powdered chemical in the intermixture may be corrosive, e.g. to metal objects such as pipes, nails, flashings, wires, cables, junction boxes, etc., at or within the walls or attics of a building in which the final fiber insulation product is to be situated. Accordingly, it is preferred in such instances to include a corrosion inhibitor in the instant solution or initially to incorporate the same in the instant precursor solid pelletized article.

Any conventional corrosion inhibitor, e.g. a water soluble or water compatible corrosion inhibitor may be used in this regard. It may be included in an effective amount by weight of substantially between about 0.05–0.3 part per part total monoammonium and diammonium phosphate present, i.e. substantially between about 5–30% by weight based on the total monoammonium and diammonium phosphate in the mixture, or typically substantially between about 0.1–1.0% by weight of the intermixture of the liquid chemical, cellulosic fiber material and, where present, the powdered chemical.

The product SHER-GARD (manufactured by Sherwin-Williams Co.) is a convenient and preferred corrosion inhibitor of organic constitution usable for the purposes of the present invention. SHER-GARD constitutes a stable solution containing a corrosion inhibitor of organic constitution in a water system in the form of a light yellow oily liquid, completely miscible with water, of specific gravity 1.08 and of pH 8.2.

In order to enhance the wetting or impregnation of the cellulosic fiber material by the solution, a conventional wetting agent or surfactant may be suitably included in the solution, such as a polyoxyethylene alkyl phenol, e.g. TRITON X-100 (manufactured by Rohm & Haas Co.). A trace amount, typically substantially between about 0.1–1% by weight of the solution, of such surfactant is generally sufficient.

Any conventional finely divided solid fire retardant material may be used as the supplement fire retardant optionally included as powdered chemical according to the present invention, e.g. in an amount by weight of substantially between about 1–9 parts based on 100 parts of the intermixture. Preferably, such powdered chemical should not be an alkali or an alkaline earth, nor have a basic pH in aqueous solution, and should generally otherwise be substantially free (as should the instant mixture itself) from constituents, including free alkali, which are able to change the preferably substantially neutral pH condition of the instant liquid chemical to a basic or alkaline pH, as this may cause adverse ammonia release, e.g. from the diammonium phosphate content, as will be appreciated more fully hereinafter.

Among the conventional supplemental fire retardants usable in this regard are boric acid, $H_3BO_3$ or $B(OH)_3$; ammonium sulfate, $(NH_4)_2SO_4$; aluminum sulfate, $Al_2(SO_4)_3 \cdot 18H_2O$; aluminum hydroxide, i.e. aluminum trihydrate, $AL_2O_3 \cdot 3H_2O$ or $Al(OH)_3$; monoammonium phosphate, $NH_4H_2PO_4$; diammonium phosphate $(NH_4)_2HPO_4$; and mixtures of any two or more thereof in any amounts totaling such 1–9 parts as noted above.

For example, typical powdered chemical amounts usable are 1–6, preferably 1 or 1–3 or 3–4, parts of boric acid; 1–9, preferably 1–2 or 4–6, parts of ammonium sulfate; 5–8 parts of aluminum sulfate; 5–8 parts of aluminum hydroxide; 1–6 preferably 3–4, parts of monoammonium phosphate; and 1–6, preferably 3–4, parts of diammonium phosphate; each such component alone or in any combination of such components totaling such 1–9 parts, i.e. based on 100 parts of the intermixture as noted above.

The finely divided solid supplemental fire retardants should also desirably have an average particle size of at least below about 4 mesh (e.g. below about 3.30 mm) for suitably acceptable operation, although much smaller particle sizes are preferred for enhanced results when this optional feature is utilized according to the present invention. Favorable results are especially obtainable when suitably at least about 80% by weight of the particles of the supplemental fire retardant have an average particle size below about 200 mesh (i.e. below about 0.074 mm) and the remaining at most about 20% by weight of such particles have an average particle size below about 4 mesh and above about 200 mesh.

However, it is more preferred that ideally at least about 95% by weight of the particles of the single or multiple component finely divided solid supplemental fire retardant material contemplated as powdered chemical have an average particle size below about 200 mesh and the remaining at most about 5% by weight of such particles have an average particle size below about 100 mesh (i.e. below about 0.150 mm) and above about 200 mesh.

While the supplemental fire retardant material may have an average particle size of below about 325 mesh (i.e. below about 0.044 mm), it is most preferred to provide predominantly all of the particles in an average size of about 200 mesh, as this will be sufficient to enhance admixing and distribution of two or more of such components when used in admixture as powdered chemical and in turn ease in achieving the desired in situ disposition of the particle component or components in the mass of fibers of the cellulosic material when this optional enrichment additive feature is utilized for preparing the ultimate composite fire retardant loose fill fiber product.

The instant monoammonium phosphate and diammonium phosphate precursor materials as well as the optional finely divided solid supplemental fire retardant material may be respectively provided conveniently in the desired particle size by conventional grinding in a micropulverizer, e.g. 60 ACM micropulverizer, as the artisan will appreciate.

The fibers of cellulosic material usable according to the present invention may be from any appropriate source as the artisan will appreciate, such as waste or recycled newspaper or newsprint and/or cardboard, yet in fact any paper type cellulosic material may be utilized. The cellulosic material source is only limited by the fact that it must provide the cellulosic fibers contemplated for combination such that, in consequence of the intermixing with the solution and optionally also with the supplemental fire retardant material, the fibers will ultimately be in substantially individual and/or loose fiber condition as contemplated for loose fill type cellulosic fiber insulation material.

In connection with the intermixing method aspect of the present invention, the aqueous solution obtained from any appropriate source, i.e. either formed by dissolving the compacted solid pelletized dosage article form mixture in sufficient water or by dissolving appropriate individual amounts of monoammonium phosphate and diammonium phosphate from any other appropriate source in sufficient water, whereby to achieve the above stated ratios by weight, is intimately contacted and intermixed with the cellulosic fiber material such as paper, cardboard, vegetable fiber, wood fiber, or other source of cellulosic fibers in an intermixing zone.

This is typically accomplished by spraying the aqueous solution at elevated pressures of at least about 90 psi pump pressure, and preferably between about 180–220 psi, sufficient to atomize the solution, onto the cellulosic fiber material as it enters a first conventional mill where the cellulosic fiber material is pulverized and from whence the liquid chemical impregnated mass is fed to a second mill for further pulverizing.

Thus, the intermixing may be suitably effected by physical percussion of the solution and cellulosic fiber material in a mill system such as a hammermill system whereby to achieve both substantial absorbing of the solution in the fibers or substantial impregnation thereof by the solution, and substantial pulverizing of the cellulosic material to provide predominantly the substantially individually loose fibers sought, i.e. in a desired loose fill condition corresponding to a low settled bulk density of substantially between about 2.0–3.1 lbs/ft$^3$.

This is generally accompanied by subjecting the mass of solution contacted cellulosic material during the pulverizing to a constant air current flow, e.g. at a rate corresponding to about 3,000 ft$^3$/min. per approximately 7,000–10,000 lbs throughput/hr. Where it is desired to reduce the water content selectively in the final loose fiber composite product, such air current flow may be conveniently provided at least in part as a selectively hot air flow, e.g. in the second hammermill.

In order to enhance the efficiency of the distribution and absorbing of the solution in the individual fibers, a conventional surfactant or wetting agent, as aforesaid, is favorably included in the solution being sprayed onto the cellulosic material.

Where the intermixing contemplates the optional inclusion of the finely divided solid supplemental fire retardant material, this is added generally as a fine powder in the second hammermill to the pulverized mass of solution absorbed fibers of cellulosic material transferred thereto from the first hammermill. Thus, this supplemental solid material is incorporated and intimately intermixed physically into the mass so that the particles of the supplemental solid material are in substantially uniform distribution therein and in intimate in situ entwined association with adjacent individual loose fibers of the cellulosic material.

Consequently, according to the present invention, the instant aqueous solution is combined advantageously with fibers of cellulosic material in the form of a composite fire retardant product in which the monoammonium phosphate and diammonium phosphate are associated together in a definite ratio relationship to each other and in substantially uniform distribution in situ throughout the cellulosic material and in effective intimate association with the corresponding fibers thereof, i.e. absorbed within the cellulose fiber itself. Preferably, the final loose fill product as aforesaid will contain in a ratio by weight substantially between about 6–16 parts of the solution and 94–84 parts of the cellulosic fiber material (i.e. based approximately on 100 parts by weight of the total finished composite fire retardant cellulosic loose fiber product), and will possess a settled bulk density of substantially between about 2.0–3.1 lbs/ft$^3$.

If the composite formulation final cellulosic product is too low in combined monoammonium and diammonium phosphate content, the fire or flame and smolder retardancy of the product will of course be adversely affected, whereas if it is too high in combined monoammonium and diammonium phosphate, the overall composition will, as well as being unduly high in bulk density, and thus uneconomical and commercially unattractive, lose some of the otherwise inherent properties such as efficient thermal insulation which the product per se is generally intended to possess in its ultimate use, e.g. as wall insulation material in homes and other buildings.

Where the finely divided solid supplemental fire retardant material is included, the composite fire retardant product will also contain the individual particles thereof in substantially uniform distribution in situ throughout the cellulosic material and in effective intimate in situ entwined association with corresponding adjacent individual loose fibers thereof. Preferably, the final loose fill product as aforesaid will contain in a ratio by weight substantially between about 6–16 parts of the solution, 1–9 parts of the finely divided solid supplemental fire retardant material and 93–75 parts of the cellulosic fiber material (i.e. based approximately on 100 parts by weight of the total finished composite fire retardant cellulosic fiber product), and will similarly possess a settled bulk density of substantially between about 2.0–3.1 lbs/ft$^3$.

It will be appreciated, of course, that the supplemental fire retardant material is normally only needed to enrich the content of fire retardant constituents, as where for any reason the content of combined monoammonium and diammonium phosphate resulting from the intermixing of the instant aqueous solution with the cellulosic fiber material is too low for achieving specific fire retardancy levels sought and particularly for meeting governmental standards or regulations.

This may be due to the practical limitations of the equipment used; e.g. liquid pumps and achievable pump pressures; especially spray nozzles, their arrangement and achievable throughputs of solution and degrees of atomization thereof; hammermill specifications and ranges of achievable mechanical percussion outputs; air blowers, their arrangement and achievable throughputs of air used; heaters for preheating portions of the air used, e.g. that applied to the mass of ingredients in the second hammermill; etc. It may also be due to other factors such as the particular degree of operator efficiency in carrying out the overall manufacturing operation with the particular equipment at hand.

Of course, too low a content of the supplemental fire retardant material will not achieve the enriching additive purpose for which it is intended to be included, whereas too high a content thereof will likewise, as well as render the product unduly high in bulk density, and thus uneconomical and commercially unattractive, result in a loss of some of the otherwise inherent properties such as efficient thermal insulation which the product per se is generally intended to possess in its ultimate use, e.g. as wall insulation material.

In any case, the final composite fire retardant product is provided most effectively in accordance with the present invention as a preferably loose fill type structural product in which the solution-derived in situ associated monoammonium phosphate and diammonium phosphate are disposed in situ in the form of a specific ratio relationship fire retardant system absorbed within the individual cellulose fibers themselves, and the particles of any enriching additive amount of finely divided supplemental fire retardant material included in the formulation are predominantly disposed in situ in entwined association and relation as particles with the adjacent individual cellulose fibers themselves.

It will be appreciated that the pulping and/or percussion action achieved during the intensive intimate intermixing, e.g. by pulverizing the appropriate ingredients in the first hammermill and then in the second hammermill, as the case may be, serves to blend and intimately interassociate the respective ingredients in the desired manner correspondingly noted above.

While ideally the ultimate composite product will contain in a ratio by weight as aforesaid about 6–16 parts solution and 94–84 parts cellulosic fiber material, or about 6–16 parts solution, 1–9 parts supplemental fire retardant material and 93–75 parts cellulosic fiber material, as the case may be, a margin of error variant of about 5 or 10% on each side of each such range may generally be accommodated without significant adverse effect, as the artisan will appreciate.

On the other hand, this is not true of the instant monoammonium and diammonium phosphate mixtures for reasons which will become manifest hereinafter.

SOLUBILITIES

Results, i.e. subject to experimental error, of actual tests performed to determine on the basis of 100 parts liquid chemical the maximum amounts of pure grade monoammonium phosphate and diammonium phosphate which can be dissolved individually and in the form of specific weight ratio relationship system mixtures according to the present invention to form saturated solutions in water at various temperatures ranging from 0° to 100° C. (32°–212° F.), and specifically the corresponding maximum percent by weight aqueous solution concentrations attained at such temperatures of such individual components, and of mixtures thereof at weight ratios of 40% mono and 60% di; 50% mono and 50% di; and 30% mono and 70% diammonium phosphate are shown in the following Table I:

TABLE I

Percent Concentration of Actual Saturated
Aqueous Solutions of Monoammonium Phosphate
(Mono) and Diammonium Phosphate (Di),
Each Alone and At Selected Mixture Ratios
(Parts Per 100 Parts Solution - Remainder Water)

| Temp. | Mono Alone | Di Alone | Mono-Di 40:60 | Mono-Di 50:50 | Mono-Di 30:70 |
|---|---|---|---|---|---|
| 0° C. | 18.0 | 36.6 | 47.0 | 34.0 | 45.0 |
| 20° C. | 27.5 | 40.8 | 53.0 | 43.0 | 49.0 |
| 40° C. | 35.9 | 45.0 | 59.0 | 52.0* | 53.0* |
| 60° C. | 45.0 | 49.2 | 65.0 | 61.0* | 57.0* |
| 80° C. | 54.5 | 53.4 | 71.0 | 70.0* | 61.0* |
| 100° C. | 62.7 | 57.6 | 77.0 | 79.0 | 65.0 |

*Calculated

It will be seen that while the saturated solution solubility of mono alone at the stated 20° C. intervals varies in slightly non-uniform increments ranging from 8.2% (between 80° and 100° C.) to 9.5% (between 0° and 20° C. and between 60° and 80° C.), that of di alone varies in 4.2% increments, that of 40% mono and 60% di varies in 6.0% increments, that of 50% mono and 50% di varies in 9.0% increments, and that of 30% mono and 70% di varies in 4.0% increments. Hence, certain of the values in Table I (as asterisked) have been calculated by extrapolation on the basis of straight line solubility curves of the pertinent saturated solutions which is consistent with such more or less uniform increments.

It will be appreciated that on the basis of trigonometry, the corresponding straight line increment or rate of change slope for each of such saturated solution solubility curves per 10° C. will be one-half of that per 20° C. as set forth in Table I above, and represents the tangent value of the particular angle of slope thereof. Specifically, the tangent of the slope angle equals the value of the difference between the saturated concentration at 100° C. and that at 0° C. (side opposite) divided by 100° C. (side adjacent).

Hence, for mono alone, an average of about 8.94/20° C. or 4.47/10° C. equals a tangent value of 0.447 (i.e. 62.7–18.0 equals 44.7 divided by 100° C. or 0.447) which corresponds to about a 24 degree slope, and for di alone, 4.2/20° C. or 2.1/10° C. equals a tangent value of 0.210 which corresponds to about a 12 degree slope.

On the other hand, for the 40% mono and 60% di mixture, 6.0/20° ° C. or 3.0/10° C. equals a tangent value of 0.300 which corresponds to about a 17 degree slope; for the 50% mono and 50% di mixture, 9.0/20° C. or 4.5/10° C. equals a tangent value of 0.450 which corresponds to about a 24 degree slope; and for the 30% mono and 70% di mixture, 4.0/20° C. or 2.0/10° C. equals a tangent value of about 0.200 which corresponds to about an 11 degree slope.

In order to place the foregoing saturated solution solubility test results in proper perspective, so as to provide a meaningful frame of reference for the saturated solution solubilities of the ratio relationship mixtures according to the present invention, 30%, 40% and 50% of the respective values obtained for mono alone at the various solution temperatures as noted in Table I were calculated alone with 70%, 60% and 50% of the corresponding respective values obtained for di alone at such temperatures. These calculated values were concordantly added together to provide an arithmetic mean at each such temperature compositely made up of 40% of the mono alone and 60% of the di alone, 50% of the mono alone and 50% of the di alone, and 30% of the mono alone and 70% of the di alone.

The appropriate arithmetic mean values thereby obtained are set forth in the following Table II:

TABLE II

Calculated Arithmetic Mean of Percent Concentrations of
30%, 40% and 50% of Actual Saturated Aqueous Solutions of Mono-
ammonium Phosphate (Mono) Alone Plus 70%, 60% and 50% Respectively
of Actual Saturated Aqueous Solutions of Diammonium Phosphate
(Di) (Parts Per 100 Parts Solution - Remainder Water)

| Temp. | Arithmetic Mean 40% of Mono Alone 60% of Di Alone | | Arithmetic Mean 50% of Mono Alone 50% of Di Alone | | Arithmetic Mean 30% of Mono Alone 70% of Di Alone | |
|---|---|---|---|---|---|---|
| 0° C. | 7.20 | } 29.16 | 9.00 | } 27.30 | 5.40 | } 31.02 |
| | 21.96 | | 18.30 | | 25.62 | |
| 20° C. | 11.00 | } 35.48 | 13.75 | } 34.15 | 8.25 | } 36.81 |
| | 24.48 | | 20.40 | | 28.56 | |
| 40° C. | 14.36 | } 41.36 | 17.95 | } 40.45 | 10.77 | } 42.47 |
| | 27.00 | | 22.50 | | 31.50 | |
| 60° C. | 18.00 | | 22.50 | | 13.50 | |

TABLE II-continued

Calculated Arithmetic Mean of Percent Concentrations of 30%, 40% and 50% of Actual Saturated Aqueous Solutions of Monoammonium Phosphate (Mono) Alone Plus 70%, 60% and 50% Respectively of Actual Saturated Aqueous Solutions of Diammonium Phosphate (Di) (Parts Per 100 Parts Solution - Remainder Water)

| Temp. | Arithmetic Mean 40% of Mono Alone 60% of Di Alone | | Arithmetic Mean 50% of Mono Alone 50% of Di Alone | | Arithmetic Mean 30% of Mono Alone 70% of Di Alone | |
|---|---|---|---|---|---|---|
|  |  | } 47.52 |  | } 47.10 |  | } 47.94 |
|  | 29.52 |  | 24.60 |  | 34.44 |  |
| 80° C. | 21.80 |  | 27.25 |  | 16.35 |  |
|  |  | } 53.84 |  | } 53.95 |  | } 53.73 |
|  | 32.04 |  | 26.70 |  | 37.38 |  |
| 100° C. | 25.08 |  | 31.35 |  | 18.81 |  |
|  |  | } 59.64 |  | } 60.15 |  | } 59.13 |
|  | 34.56 |  | 28.80 |  | 40.32 |  |

It will be seen that these arithmetic mean values at the stated 20° C. intervals vary in slightly non-uniform increments like the case of those for mono alone. Accordingly, in this regard, for the arithmetic mean 40% mono and 60% di calculated mixture, an average of about 6.096/20° C. or 3.048/10° C. equals a tangent value of 0.3048 (i.e. 59.64−29.16 equals 30.48 divided by 100° C. or 0.3048) which corresponds to about a 17 degree slope. For the arithmetic mean 50% mono and 50% di calculated mixture, an average of about 6.570/20° C. or 3.285/10° C. equals a tangent value of 0.3285 (i.e. 60.15−27.30 equals 32.85 divided by 100° C. or 0.3285) which corresponds to about an 18 degree slope. For the arithmetic mean 30% mono and 70% di calculated mixture, an average of about 5.622/20° C. or 2.811/10° C. equals a tangent value of 0.2811 (i.e. 59.13−31.02 equals 28.11 divided by 100° C. or 0.2811) which corresponds to about a 15 degree slope.

To visualize the impact of the differences in the actual and calculated results obtained in terms of the values set forth in Tables I and II above, these have been plotted on the graph of the drawing to provide the concordant solubility curves for these various solutions. In all instances, such curves significantly provide more or less straight line curves, but their respective slopes and orders of magnitude of concentration at saturation are anything but predictable in relation to one another, i.e. in terms of changing saturated solution concentration per unit change in temperature from 0°–100° C.

Just as in the case of the slopes as calculated from the data in Tables I and II above, in the drawing the curve for mono alone has a 24 degree slope while that for di alone has a 12 degree slope. The curve for the 30:70 arithmetic mean mixture has a slope of about 15 degrees, that for the 40:60 arithmetic mean mixture has a slope of about 17 degrees, and that for the 50:50 arithmetic mean mixture has a slope of about 18 degrees. These arithmetic mean mixture slopes predictably lie between those of the mono alone and di alone, and all of these corresponding solutions have just about the same concentration at 80° C. With the exception of the lower end of the slope at 0° C. to about 10° C. for the actual 50:50 mixture according to the invention, all of the solubilities of the mono alone, di alone, and corresponding arithmetic mean mixtures, are surprisingly well below those of the instant actual ratio mixtures at any given temperature.

More important, however, is the fact that the curves for the instant actual 40:60 mixture, actual 50:50 mixture and actual 30:70 mixture, do not follow the pattern depicted in the drawing by the curves of the known solutions of mono alone and di alone, nor those of the predictable arithmetic mean curves. Instead, the curves for the instant actual mixtures intersect at odd points and have different slopes.

In this regard, as depicted in the drawing, the curve of the instant actual 30:70 mixture has a slope of about 11 degrees, that of the instant actual 40:60 mixture has a slope of about 17 degrees, and that of the instant actual 50:50 mixture has a slope of about 24 degrees. These slopes are not only respectively different from those of the calculated predictable arithmetic mean 30:70, 40:60 and 50:50 mixtures, i.e. of 15 degrees, 17 degrees and 18 degrees, concordantly, but also the actual mixture slopes as shown in the drawing extend over a much broader overall range or area of saturated concentration as well as embrace a generally pronouncedly higher concentration than in the case of the arithmetic mean mixtures.

As to their counterpart mono alone and di alone slopes, the 12 degree slope of the di alone is closest to the 11 degree slope of the actual 30:70 mixture, whereas the 24 degree slope of the mono alone is closest to the 24 degree slope of the actual 50:50 mixture but otherwise unlike those of the remaining actual mixtures. In contrast to the common roughly 53% saturation concentration for the mono alone and di alone at 80° C., a common saturation for the instant actual 50:50 and 30:70 mixtures occurs at about 44° C. and at roughly such 53% concentration, whereas that for the instant actual 50:50 and 40:60 mixtures occurs at about 87° C. and at roughly 72.5% saturated concentration.

As earlier noted, at the lower end of the slope at about 10° C., the instant actual 50:50 mixture has a common saturation at about 38.5% concentration with the di alone. Otherwise, the instant actual mixtures according to the present invention comprehend a large overall area of the graph of the drawing at generally significantly higher saturated concentrations than those obtained with the mono alone and with the di alone.

While it might have been expected that the slope of the actual 50:50 mixture would correspond to the slope of the arithmetic mean 50:50 mixture, it is indeed surprising that not only is this not so, but also that, if anything, the actual 50:50 mixture slope roughly corresponds to that of the mono alone, albeit at much higher actual concentrations than those of the mono alone, and is completely different from and indeed intersects at about 10° C. with the slope of the di alone.

It is certainly unexpected that the slope of the actual 30:70 mixture would correspond to the slope of the di alone, yet at much higher concentrations than those of the di alone, and be so different from that of the mono alone as well as from those of each of the arithmetic mean mixtures. This cannot be explained on the basis of the increase of the di portion and the decrease of the mono portion in changing from the actual 50:50 mixture to the actual 30:70 mixture, because the concentrations involved are much higher than those obtained in the case of the mono alone and the di alone. This is emphasized by the fact that the slope of the actual 40:60 mixture, instead of lying intermediate to the slopes of the actual 30:70 and 50:50 mixtures, as might otherwise have been expected on the basis of the pattern of the arithmetic mean 30:70, 40:60 and 50:50 mixture slopes, is situated for the most part substantially above the slopes of the actual 30:70 and 50:50 mixtures.

It is thus particularly unexpected that the slope of the actual 40:60 mixture not only differs from the others but also involves saturated solution concentrations generally far above all other solutions tested, save for the higher concentrations obtained with the actual 50:50 mixture at about 87°–100° C., especially considering that the actual 50:50 mixture has a lower concentration than the di alone at about 0°–10° C. whereas the actual 40:60 mixture has a much higher concentration than both at such 0°–10° C. temperature span.

At best, it might have been expected that the actual 40:60 mixture would have a slope intermediate those of the actual 50:50 and 30:70 mixtures and a common point of intersection therewith at about 44° C., rather than only a point of intersection with the actual 50:50 mixture and at about 87° C. as opposed to 44° C.

As demonstrated by the actual test results set forth in Table I above, i.e. subject to possible experimental error, and concordant straight line extrapolation calculated values also there tabulated, it was not predictable that the saturated solution concentrations from 0° to 100° C. for the instant actual 30:70, 40:60 and 50:50 mixtures would be of such higher orders of magnitude than those of the mono alone and the di alone, and would encompass individually as well as collectively such a large graph area as depicted in the drawing.

Naturally, of course, all such mixtures in the ratio relationship range of substantially between about 30%–50% monoammonium phosphate and 70%–50% diammonium phosphate are contemplated according to the present invention, because these lead in aqueous solution form to maximum concentration saturated solutions more or less consistently above those of mono alone and of di alone throughout the range from 0°–100° C., save for the case of the 50:50 mixture between 0° and about 10° C. as compared with di alone.

Nevertheless, such solutions need not be saturated solutions in every instance so long as they are in the 10 part weight ratio concordantly of substantially between about 3–7.9 parts total mono and diammonium phosphate and 7–2.1 parts water, as the case may be, according to the present invention. While the high side of such range in terms of the mixture as solute in the water as solvent is only to be limited by the maximum content of such mixture which can inherently be dissolved in water to form the corresponding saturated solution at any given corresponding temperature, the low side of such range is to be limited as a practical matter to the minimum content of such mixture which is consistent with practical operations at such temperature in accordance with the overall aims and purposes of the present invention.

More specifically, since the purpose of providing the aqueous solution is to include as much of the fire retardant monoammonium and diammonium phosphate in the liquid chemical added per unit weight to the cellulosic fiber material as possible, or at least as practicable, under the most efficient system conditions of the production operation selected, the use of dilute solutions would run counter to the stated aims and purposes of the present invention. Hence, at least about 3 parts per 10 parts of the solution will be the mixture and at most 7 parts thereof will be the water, thereby providing at least a 30% by weight concentration aqueous solution whether composed of the 30:70, 40:60 or 50:50 mixture.

The use of less than saturated solutions may occur for instance where the system conditions of the production operation are at less than full efficiency for any one of a number of reasons, as in the case of deviations during start-up of the manufacturing run, operator error, etc. However, such minimum practical concentration of about 30% is generally not preferred since even at 0° C., a saturated solution of the 50:50 mixture may be readily obtained to provide about a 34% concentration liquid chemical at such temperature, whereas a saturated solution of the 30:70 mixture may be readily obtained to provide about a 45% concentration liquid chemical at such temperature while a saturated solution of the 40:60 mixture may be likewise obtained to provide about a 47% concentration liquid chemical at such temperature.

Considering that under most climatic conditions at most geographical locations, regardless of the season of the year, the ambient temperature will normally be at least 10° C. and generally about 20° C., the corresponding higher saturated solution concentrations for each of such mixtures will be even more readily obtained, or at least solution concentrations significantly higher than 30%, whether as saturated solutions or not, in view of the solubility properties of these solutes in water as solvent as demonstrated in Table I and depicted in the graph of the drawing.

PROPORTIONS

In carrying out the aims of the present invention, the weight ratio of the monoammonium phosphate and diammonium phosphate, for instance in terms of a total of 10 parts of the mixture for useful results should remain within the desired range of about 3–5 parts monoammonium phosphate and 7–5 parts diammonium phosphate.

In this regard, it has been found that if more than about 5 parts monoammonium phosphate and correspondingly less than about 5 parts diammonium phosphate are present in the 10 part mixture, e.g. a 6:4 ratio of monoammonium to diammonium phosphate, the desired concentration of both in the resulting aqueous solution to be used as liquid chemical will be too low for favorable practical results and too little fire retardant liquid chemical per quantity of water present will be intermixed with the cellulosic fiber material.

More specifically, the amount of monoammonium phosphate dissolved will be significantly high and the amount of diammonium phosphate dissolved will be undesirably low, with the result that the overall minimum desired quantities of each will not be attained in the at least 30% by weight concentration aqueous solution to be used. The contemplated ratio range insures that in terms of the solubilities at any given temperature of the mixtures contemplated, the desired quantity of diammonium phosphate will be available for intermixing into the fibers for its fire retardancy properties to be maximumly effective.

If less than about 3 parts monoammonium phosphate and correspondingly more than about 7 parts diammonium phosphate are present in the 10 part mixture, e.g. a 2:8 ratio of monoammonium to diammonium phosphate, the resulting aqueous solution will be too basic in pH for favorable practical results.

More specifically, such a basic pH mixture in solution will cause objectionable release of ammonia during the manufacturing operation in the liquid chemical spraying system and in the hammermill system as well as in the fiber insulation product when placed at or within the wall of the building at the end point of use intended. Needless to say, noxious evolution of ammonia and its objectionable attendant odor should be avoided in line with the aims and purposes of the present invention.

In this regard, on the basis of a 10 part mixture in aqueous solution form, e.g. with 10 parts water (50% concentration solution), a 3:7 ratio of mono to diammonium phosphate will have a pH of about 7.1; a 5:5 ratio of mono to diammonium phosphate will have a pH of about 6.5; and a 4:6 ratio of mono to diammonium phosphate will have a pH of about 6.8.

Although the reasons are not fully understood, it is believed that the molecules of monoammonium phosphate, in the content of monoammonium phosphate in the specific ratio relationship system with the content of diammonium phosphate in the absorbed condition of the liquid chemical in the fibers of the cellulosic material, serves to tie up or bind or form complexes with the ammonium content or molecular ammonia portion of the diammonium phosphate molecules, under the inherent intimate association in situ of the molecules of monoammonium phosphate and the molecules of diammonium phosphate in the resultant proportions of each within the fibers.

This binding, complexing or inhibiting effect of the monoammonium phosphate on the diammonium phosphate in turn explains the surprising absence from the final insulation products produced according to the present invention of any tendency toward ammonia release as might otherwise be attributable to the diammonium phosphate.

On the one hand, as is clear from the foregoing, generally poorer solubilities at lower temperatures, i.e. at about 0°–25° C., are obtained with the 50% mono and 50% diammonium phosphate ratio mixture, although with good molecular binding of the diammonium phosphate content by the comparatively high proportional content of the monoammonium phosphate at a favorably low pH so as to inhibit such ammonia release.

On the other hand, although fair solubilities at any given temperature are obtained with the 30% mono and 70% diammonium phosphate ratio mixture, generally less effective molecular binding of the diammonium phosphate content will be possible because of the comparatively low proportional content of the monoammonium phosphate available for inhibiting such ammonia release and because of the higher pH of the resultant system.

In the case of the 40% mono and 60% diammonium phosphate ratio mixture, however, with the exception of the high side of the range, i.e. at about 85°–100° C., the highest solubilities at any given temperature are obtained, sufficient molecular binding of the diammonium phosphate and inhibition of ammonia release are achieved, and an acceptably low pH is exhibited by the resultant system.

A ratio of 4:6 mono to diammonium phosphate on a total 10 parts by weight basis is therefore most preferred, especially in the form of a 50%–55% aqueous solution at temperatures of about 10°–27° C. (cf. the drawing), as this provides high desired concentrations in the solution of each of the monoammonium phosphate and diammonium phosphate components essential to the aims and purposes of the present invention at a favorably acceptable pH and with sufficient inhibition of ammonia release, and in turn high concentrations in the liquid chemical loadings, e.g. 6%–16% by weight of the intermixture, which may be conveniently incorporated at ambient temperature into the cellulosic fiber material during the intermixing operation in the hammermill system.

Within the operable limits of at least 30% concentration solutions up to the corresponding maximum solubility at any given temperature, for the various weight ratio mixtures contemplated by the present invention and in accordance with the results shown in Table I above and depicted in the graph of the drawing, broadly, on a 10 part by weight basis, about 3–5 parts monoammonium phosphate to 7–5 parts diammonium phosphate will generally be present in the solid form mixture or in the solution form mixture, so that this specific ratio relationship mixture system of these two ammonium phosphates will advantageously exist in the fibers of the final cellulosic product.

On a diammonium phosphate basis, this weight ratio relationship may be stated as substantially between about 0.429–1 parts monoammonium phosphate per part diammonium phosphate. Conversely, on a monoammonium phosphate basis such relationship may be stated as substantially between about 1–2.333 parts diammonium phosphate per part monoammonium phosphate.

In turn, broadly on a 10 part by weight basis, a ratio of about 3–7.9 or 3–7 parts total monoammonium phosphate and diammonium phosphate (i.e. in the foregoing 10 part weight ratio relationship of about 3–5 parts monoammonium phosphate to 7–5 parts diammonium phosphate) to about 7–2.1 or 7–3 parts water will generally be present in the corresponding aqueous solution, depending on the liquid chemical temperature, thereby providing substantially between about 30%–79% or 30%–70% by weight corresponding aqueous solutions.

On a water basis, this solution concentration ratio may be stated as substantially between about 0.429–3.762 or 0.429–2.333 parts total monoammonium phosphate and diammonium phosphate per part water. Conversely, on a total combined ammonium phosphate basis such solution concentration ratio may be stated as also substantially between about 0.429–3.762 or 0.429–2.333 parts water per part total monoammonium phosphate and diammonium phosphate.

More specifically, on a 10 part by weight basis, preferably about 3.5–5, more preferably about 4–5, and most preferably about 3.5–4.5, parts monoammonium phosphate to correspondingly 6.5–5, more preferably 6–5, and most preferably 6.5–5.5, parts diammonium phosphate will generally be present in the solid form mixture or in the solution form mixture, so that the concordant specific weight ratio relationship mixture system of these two ammonium phosphates will exist in the fibers of the final cellulosic product.

On a diammomium phosphate basis, such corresponding weight ratio relationship may be stated as preferably substantially between about 0.538-1, more preferably substantially between about 0.667-1, and most preferably substantially between about 0.538-0.818, parts monoammonium phosphate per part diammonium phosphate. Conversely, on a monoammonium phosphate basis, such relationship may be stated as preferably substantially between about 1-1.857, more preferably substantially between 1-1.5, and most preferably substantially between about 1.223-1.857, parts diammonium phosphate per part monoammonium phosphate.

In turn, on a 10 part by weight basis, a ratio of preferably about 3.5-6.5, more preferably about 4-6, and most preferably about 4.5-5.5, parts total monoammonium phosphate and diammonium phosphate (i.e. in the foregoing 10 part weight ratio relationship of about 3.5-5, 4-5 or 3.5-4.5, parts monoammonium phosphate to correspondingly 6.5-5, 6-5 or 6.5-5.5, parts diammonium phosphate, as the case may be) to correspondingly 6.5-3.5, more preferably 6-4, and most preferably 5.5-4.5, parts water will generally be present in the corresponding aqueous solution, depending on the liquid chemical temperature, thereby providing substantially between about 35%-65%, 40%-60% and 45%-55% concentration aqueous solutions respectively.

On a water basis, this solution concentration ratio may be stated as substantially between about 0.538-1.857, 0.667-1.5 and 0.818-1.223, parts respectively total monoammonium phosphate and diammonium phosphate per part water. Conversely, on a total combined ammonium phosphate basis such solution concentration may be stated as also substantially between about 0.538-1.857, 0.667-1.5 and 0.818-1.223, parts respectively of water per part total monoammonium phosphate and diammonium phosphate.

Particularly preferred, on a 10 part by weight basis, are solutions in the ratio of about 3.8-5.7 parts total monoammonium phosphate and diammonium phosphate to 6.2-4.3 parts water, especially where on a 10 part by weight basis the ratio relationship of the mixture itself constitutes about 4-5 parts monoammonium phosphate and 6-5 parts diammonium phosphate (cf. the drawing). On a water basis, this solution concentration ratio may be stated as substantially between about 0.613-1.326 parts monoammonium phosphate and diammonium phosphate per part water. Conversely, on a total combined ammonium phosphate basis such solution concentration ratio may be stated as also substantially between about 0.613-1.326 parts of water per part total monoammonium phosphate and diammonium phosphate.

Preferred species of solution formulations on a 20 part by weight basis include about 4 parts monoammonium phosphate, 6 parts diammonium phosphate and 10 parts water (e.g. about a 50% concentration solution of the 40:60 ratio mixture at about at least 10° C.); 4.3 parts each of monoammonium phosphate and diammonium phosphate and 11.4 parts water (e.g. about a 43% concentration solution of the 50:50 ratio mixture at about at least 20° C.); and about 5 parts each of monoammonium phosphate and diammonium phosphate and 10 parts water (e.g. about a 50% concentration of the 50:50 ratio mixture at about at least 35° C.)

Preferred species of intermixture formulations on a 100 part by weight basis, depending on the particular circumstances include:

| Total mono and di-ammonium phosphate | Total Water | Total Cellulosic Fiber Material |
|---|---|---|
| about 3 parts | about 7 parts | about 90 parts |
| about 7 parts | about 3 parts | about 90 parts |
| about 4 parts | about 6 parts | about 90 parts |
| about 5 parts | about 5 parts | about 90 parts |
| about 3 parts | about 3 parts | about 94 parts |
| about 4 parts | about 4 parts | about 92 parts |
| about 6 parts | about 6 parts | about 88 parts |
| about 7 parts | about 7 parts | about 86 parts |
| about 8 parts | about 8 parts | about 84 parts |

In the last noted case of 8 parts water to 84 parts cellulosic material, the operation is preferably carried out with the use of a hot air current flow to drive off a selective extra portion of the water content present to reduce the total remaining water content in the corresponding final product to a desirably low residual level.

Thus, it will be appreciated from the foregoing that the essence of the provision for the aqueous solution system in accordance with the present invention is to assure the inclusion during the manufacturing operation of a precisely controllable ratio of mono to diammonium phosphate in absorbed or impregnated in situ condition in the fibers, as well as a selectively accurate and adequate fire retardant amount of total monoammonium phosphate and diammonium phosphate per unit weight of final product distributed intimately and uniformly therein, while using the minimum amount of water practical under the circumstances for achieving an acceptably low bulk density final product free from objectional dampness and at the same time avoiding conditions which will lead to the evolution of ammonia either during the manufacturing operation or when placed within the wall of the building or other location at the end point of use, all at the inclusion of the minimun total amount of monoammonium phosphate and diammonium phosphate per unit weight of final product practical under the circumstances which is consistent with the meeting of governmental standards and regulations whereby to minimize the overall cost and weight of the final product and achieve maximal commercial success.

However, the degree of success in achieving the foregoing aims and purposes of the various overall aspects of the present invention, especially in terms of meeting governmental standards and regulations such as those contemplated by Federal Specification HHI-515D, is dependent as a practical matter more or less directly upon the efficiency of the particular plant equipment installation for carrying out the intermixing operation by which the aqueous solution, i.e. liquid chemical, is contacted, distributed and intermixed with the cellulosic fiber material, i.e. recycled newspaper, cardboard, etc. More specifically, it is dependent upon the efficiency of the liquid chemical feed injection system and type of other manufacturing equipment such as liquid pumps, air blowers, hammermills and the like.

Such liquid chemical feed injection system, of course, should ideally be such that selectively as much liquid chemical as possible can be injected into a given amount of incoming newspaper, cardboard, etc. per unit time, whereby versatile adjustment of the quantity of liquid chemical per unit weight of final product per unit time can be attained as desired and more particularly of the quantity of total monoammonium phosphate and diammonium phosphate per unit weight of final product per unit time, and conversely of the complemental quantity of water per unit weight of final product per unit time, depending upon the selected concentration of the aqueous solution and the operating temperature.

Although the use of a liquid chemical spray system has been found in accordance with the present invention to be particularly favorable and is thus presently preferred as the means for feed injection of selectively as much as possible of the aqueous solution into a given amount of the cellulosic fiber material per unit time as it is being fed to the intermixing zone, i.e. the first hammermill, nevertheless the practical efficiency of such spray system is per se influenced by the location of the injection spray nozzles and the concomitant arrangement of the individual sprays in relation to the breadth and extent of the flow path of the incoming newspaper, cardboard, etc. and more specifically to the available area of the incoming newspaper, cardboard, etc. exposed to the liquid chemical spray upstream of the first hammermill.

Where the efficiency of the plant installation, and especially of the liquid chemical feed injection system, under the actual operating conditions is such that insufficient total monoammonium phosphate and diammonium phosphate is added to the incoming cellulosic fiber material via the liquid chemical injected thereinto for attaining the required amount of such mono and diammonium phosphate in the final product for fire retardancy purposes, it then becomes necessary to bolster the level of fire retardancy, e.g. to meet such governmental standards and regulations.

FOUR ALTERNATIVES

Four alternatives logically present themselves for achieving practical success in carrying out the foregoing aims and purposes of the various overall aspects of the present invention. The first alternative is to carry out the operation using the liquid chemical alone under normal conditions at ambient temperature, and if this results in the inclusion of an insufficient amount of total mono and di-ammonium phosphate in the final product, then optionally such insufficiency can be offset or corrected by the second, third or fourth alternative.

The second alternative is to add, as aforesaid, an enriching additive amount of such conventional finely divided solid supplemental fire retardant material, i.e. powdered material, such as boric acid, ammonium sulfate, aluminum sulfate, aluminum hydroxide, monoammonium phosphate, diammonium phosphate, or mixtures of two or more of such finely divided solid supplemental materials, to the mass of liquid chemical and cellulosic fiber material during the intermixing operation, e.g. in the second hammermill, whereby to attain an acceptable level of fire retardancy in the final product.

The third alternative is to carry out the operation using the liquid chemical alone, but heated above ambient temperature to provide a maximumly saturated hot aqueous solution (cf. Table I above and the drawing) containing as high a content of total mono and di-ammonium phosphate as practicable under the operating conditions. As a result, of the otherwise inefficient maximum amount of liquid chemical which can be added by the feed injection system to the incoming cellulosic fiber material per unit time, a higher proportion of total mono and di-ammonium phosphate relative to the proportion of water present will be intermixed with the fibers than in the case of the operating conditions under the first alternative, whereby in turn to attain an acceptable level of fire retardancy in the final product.

Lastly, the fourth alternative is to carry out the operation using the liquid chemical alone under normal conditions at ambient temperature, but at a concordantly selectively reduced throughput of cellulosic fiber material per unit time; and offsetting the excess water content in the thereby formed damp pulp or dense wet mass of liquid chemical impregnated fibers by adding sufficient heat to the air current flow applied thereto, e.g. in the second hammermill, such that the resultant hot air will cause the selective evaporation concomitantly of such excess water content, whereby to attain an acceptable level of fire retardancy in the final product while at the same time achieving a final product bulk density and residual moisture content corresponding to the final product bulk density and residual moisture content concomitantly otherwise attained or selectively attainable under each of the foregoing first, second and third alternatives.

On a weight basis of 100 pts of the intermixture, broadly the range of fire retardant chemical loading by the instant mixture amounts to substantially about 1.8–12.64 or 1.8–11.2 pts total mono and di-ammonium phosphate in 6–16 pts liquid chemical of about 30–79% or 30–70% aqueous solution concentration (30% mono and di-ammonium phosphate and 70% water to about 79 or 70% mono and di-ammonium phosphate and 21 or 30% water), with the remaining 94–84 pts being the cellulosic fiber material.

This is based on the fact that at a 6 pts liquid chemical loading, depending on the liquid chemical temperature (cf. Table I above), 1.8 pts total mono and di-ammonium phosphate and 4.2 pts water may be present in an aqueous solution of minimum concentration of about 30%, and conversely about 4.74 or 4.2 pts total mono and di-ammonium phosphate and 1.26 or 1.8 pts water may be present in a high temperature or hot (e.g. 80° or 100° C.) saturated aqueous solution of maximum concentration of about 79 or 70%; and that at a 16 pts liquid chemical loading 4.8 pts total mono and di-ammomium phosphate and 11.2 pts water may be present in such an aqueous solution of minimum concentration of about 30% and conversely about 12.64 or 11.2 pts total mono and di-ammonium phosphate and 3.36 or 4.8 pts water may be present in a high temperature or hot (e.g. 80° or 100° C.) saturated aqueous solution of maximum concentration of about 79 or 70%.

Of course, at the preferred aqueous solution concentration of about 50% (especially at the 40% mono and 60% di-ammonium phosphate weight ratio), at a 6 pts liquid chemical loading 3 parts total mono and di-ammonium phosphate and 3 pts water will be present, and correspondingly at a 16 pts liquid chemical loading 8 pts total mono and di-ammonium phosphate and 8 pts water will be present.

Since the normal source of the monoammonium phosphate and of the diammonium phosphate as contemplated herein is a relatively impure agricultural grade material which may contain up to about 2% free acid, and since such free acid may exhibit a corrosive effect on metal materials with which the final insulation product may come into contact at the end point of use, and since in the case of the optional inclusion of a finely divided supplemental fire retardant material in the final insulation product a like corrosion effect on such metal materials may be exhibited, the optional yet preferred inclusion as aforesaid of a corrosion inhibitor in the final insulation production is contemplated herein, i.e. in an amount of substantially between about 0.05-0.30 pts/pt total mono and di-ammonium phosphate present, for each of such reason.

Consequently, on said 100 pt weight basis, broadly the intermixture will also include substantially about 0.09-3.792 or 0.09-3.36 pts corrosion inhibitor per 1.8-12.64 or 1.8-11.2 pts total mono and di-ammonium phosphate in the 6-16 pts liquid chemical of 30-79 or 30-70% aqueous solution concentration. The added loading represented by the inclusion of such concordantly minor amount of the corrosion inhibitor in the intermixture is not sufficiently significant to detract adversely from the loose fill condition and resultant bulk density of the final insulation product, nor will its presence disturb or modify significantly the relatively much higher respective proportions of liquid chemical and cellulosic fiber material, and optional powdered chemical, usable in the intermixture and present in the final insulation product.

Of course, where the optional inclusion of the finely divided solid supplemental fire retardant material, i.e. powdered chemical, is omitted, the amount of corrosion inhibitor included in the intermixture will be concordantly even smaller since its purpose will only be to counteract the corrosive effect of any such correspondingly minor amount of free acid present. On the other hand, where the powdered chemical is included, this will normally be warranted only where the liquid chemical loading is undesirably insufficient for achieving approvable levels of fire retardancy.

Consequently, the total chemical loading constituted by the insufficient liquid chemical loading, the enriching additive amount represented by the powdered chemical loading and the counteracting amount of corrosion inhibitor will normally remain within acceptable levels so as not to unduly load the final insulation product and otherwise detract from the loose fill condition and desired low bulk density thereof.

Nevertheless, broadly the total chemical loading may favorably include about 6-16 pts liquid chemical and about 1-9 pts powdered chemical, as well as about 0.09-3.792 or 0.09-3.36 pts corrosion inhibitor, with the remainder of about 93-75 pts cellulosic fiber material in the intermixture downwardly adjusted in fact by such latter amount to about 92.91-71.208 or 92.91-71.64 pts or roughly to about 93-71 or 93-72 pts, without detracting from the loose fill condition and desired low bulk density in the final insulation product.

Obviously, it is most desirable to carry out the operation at ambient temperature under the first alternative as this is generally the most convenient and least costly and therefore the most efficient method. However, where the inherent limitations in the plant equipment installation are such that under the first alternative so much liquid chemical is needed to meet governmental standards and regulations that a poor product results in practical terms, e.g. a damp product which is too high in bulk density, then a versatile choice among the other three alternatives is advantageously possible according to the present invention.

The provision for modifying the plant equipment installation to accommodate a second screw conveyor or auger for feeding the powdered chemical to the second hammermill, and the extra material cost represented by the inclusion of such powdered chemical in the final product, under the second alternative, must be balanced against the need under the third alternative to modify the liquid chemical storage and feed injection system apparatus to provide for the heating of the liquid chemical to attain maximum mono and di-ammonium phosphate solubility in the water content and for the maintaining of the heated liquid chemical in proper heated condition at the necessary temperature (i.e. to assure that the liquid chemical injected onto the incoming feed of cellulosic fiber material will be at the desired saturated concentration, without premature precipitation therefrom of significant quantities of either or both of the monoammonium phosphate and diamonium phosphate, which would lower the needed total content of these two components in the spray and/or the acceptable weight ratio range relationship there between of 30-50% monoammonium phosphate and 70-50% diammonium phosphate). These second alternative requirements must also be balanced against the need under the third alternative to provide heat energy at extra cost for heating the liquid chemical.

The factors involved in the modifications for using the second and third alternatives must each also be balanced against the need under the fourth alternative for modifying the plant equipment installation to accommodate heating means for preheating to selectively high temperature the air current flow applied at the second hammermill to evaporate a selective portion of the water content in the liquid chemical, and the need to provide heat energy at extra cost for heating such air current flow, whereby to drive off the excess water content derived from the concomitant over supply of liquid chemical (per unit weight of cellulosic fiber material) initially intermixed with the incoming feed of such cellulosic fiber material so as to assure an adequate content of mono and di-ammonium phosphate in the final product at the expense of an otherwise excessively damp and high density mass of the intermixture.

For instance, under the third alternative, specifically 10 pts liquid chemical loading can be used with 90 pts cellulosic fiber material just as under the first alternative, but instead of at about a convenient 50% solution concentration of 5 pts total mono and di-ammonium phosphate and 5 pts water, rather at up to about a maximum 79 or 70% solution concentration of 7.9 or 7 pts total mono and di-ammonium phosphate and 2.1 or 3 pts water. Thus, by adding heat to the system (e.g. liquid chemical temperatures up to 80° or 100° C.) under the third alternative, more mono and di-ammonium phosphate and less water will be available for intermixing with the cellulosic fiber material, thereby minimizing the relative amount of water and maximizing the amount of mono and di-ammonium phosphate per unit weight of the final insulation product.

A significant advantage of this third alternative is that it offers the permitted conjoint use of the second alternative therewith Just as in the obvious case of the permitted conjoint use of the first alternative with the second alternative. Thus, for example rather than using specifically 10 pts liquid chemical loading, e.g. at about a 50% solution concentration, under the first alternative together with 4 pts chemical loading under the second alternative, for a total chemical loading of 9 pts, with 86 pts cellulosic fiber material, instead under the third alternative 10 pts liquid chemical loading, e.g. at about a 70% solution concentration (about 80° C.), can be used together with 4 pts powdered chemical loading under the second alternative, for a total chemical loading of 11 pts, with 86 pts cellulosic fiber material, whereby to attain a 2 pts higher total chemical loading of fire retardant materials.

Alternatively, and more advantageously, correspondingly less than 4 pts powdered chemical loading may be used under the second alternative, e.g. 2 pts, with the stated amount of liquid chemical loading under the third alternative, whereby to attain a total chemical loading of 9 pts fire retardant materials corresponding to that otherwise obtained with the 10 pts liquid chemical loading and 4 pts powdered chemical loading under the conjoint first and second alternatives.

Thus, the third alternative offers the advantage over the first alternative of providing a higher content of mono and di-ammonium phosphate per total amount of liquid chemical in the final product, whether the second alternative is conjointly used or not. Where the second alternative is conjointly used, the third alternative offers the further versatile advantage over the first alternative, either that a correspondingly higher total chemical loading of liquid chemical and powdered chemical may be attained in the final product directly traceable to the higher concentration of the hot liquid chemical used in the third alternative, or that the same total chemical loading may be attained in the final product directly traceable to the use of a concomitantly lower amount of powdered chemical in relation to such higher concentration of the hot liquid chemical used in the third alternative.

As to the fourth alternative, this similarly offers the advantage over the first alternative that where so much liquid chemical is needed to meet governmental standards and regulations that the product which would otherwise result would be objectionably damp and too high in bulk density, the conditions of operation insofar as the liquid chemical loading is concerned need not be changed, but instead heat may be versatilely added to the air current flow applied at the second hammermill to drive off the excessive water content.

This fourth alternative is otherwise also usable conjointly with the second alternative in the same way and for the same aims and purposes in essence as the conjoint use of the second alternative with the first alternative. To the extent that the fourth alternative results in the ultimate inclusion of a higher content of mono and di-ammonium phosphate in the final product, after the applying of the hot air current flow to the intermixture, than that attainable under the first alternative, whereby to meet governmental standards and regulations, the fourth alternative is also usable conjointly with the second alternative in the same way and for the same aims and purposes in essence as the conjoint use of the second alternative with the third alternative.

For instance, under the fourth alternative, specifically 14 pts liquid chemical loading can be used with 86 pts cellulosic fiber material at about a convenient 50% solution concentration, providing 7 pts total mono and di-ammonium phosphate and 7 pts water, rather than only 5 pts total mono and di-ammonium phosphate and 5 pts water as in the above case of 10 pts liquid chemical loading with 90 pts cellulosic fiber material under the first alternative. Thus, by adding heat to the air current flow applied at the second hammermill, e.g. at a rate corresponding to about 1 million BTU/hr. to the 3,000 ft$^3$/min. air current rate per 7,000–10,000 lbs throughput/hr applied thereat, the excess water may be driven off such as to the extent of 2 pts water. This will provide a final product containing 7 pts total mono and di-ammonium phosphate, 5 pts water and 86 pts cellulosic fiber material.

This represents a final total chemical loading of 7 pts per 86 pts of cellulosic material (about 8.14% chemical loading based on 86 pts cellulosic fiber material) or 7 pts per 98 pts chemical, water and cellulosic material (about 7.14% chemical loading based on 98 pts final product), as compared with the final total chemical loading in the above noted instance under the first alternative of 5 pts per 90 pts of cellulosic material (about 5.56% chemical loading based on 90 pts of cellulosic fiber material or 5 pts per 100 pts chemical, water and cellulosic material (5% chemical loading based on 100 pts final product).

The difference is even more pronounced, of course, where specifically 16 pts liquid chemical loading (50% solution concentration) is used with 84 pts cellulosic fiber material and 3 pts or even 2 pts excess water is driven off, as the artisan will appreciate.

Upon using the fourth alternative with either or both of the second and third alternatives, the corresponding collective advantages contributed by each such alternative will of course favorably be obtained. Thus, an excessive amount of liquid chemical may be intermixed with the incoming cellulosic fiber material, such excessive amount of liquid chemical may be optionally provided as hot saturated maximum concentration solution under the third alternative, and hot air may be provided for driving off excess water at the second hammermill under the fourth alternative, similarly optionally with the addition of powdered chemical at the second hammermill under the second alternative, whether the excessive amount of liquid chemical used is optionally hot saturated maximum concentration solution under the third alternative or not.

It must be emphasized that the aims and purposes of optionally including the second alternative are only to enrich the final product with sufficient additive powdered chemical to meet governmental standards and regulations, should the resulting final product produced according to the instant production operation, due to inefficiency or otherwise, be insufficient in the desired liquid chemical derived mono and di-ammonium phosphate fire retardants for attaining such objective. Naturally, it is preferred that where the powdered chemical contemplates diammonium phosphate, the same be accompanied by a sufficient amount of monoammonium phosphate in intimate admixture therewith to satisfy the weight ratio range of mono and di-ammonium phosphate contemplated by the liquid chemical herein in a secondary attempt to minimize the tendency of the diammonium phosphate to release ammonia for the reasons earlier discussed.

On the other hand, the aims and purposes of the third and fourth alternatives are independent of each other and of those of the second alternative, whereby versatilely to insure in each instance that the final product will include sufficient mono and di-ammonium phosphate in the specific ratio relationship system for fire retardancy and at the same time possess a desired low bulk density at minimal cost, depending on the efficiency of the plant equipment installation. Hence, optionally only that amount of enriching additive powdered chemical is provided under the second alternative as may be necessary to insure that the final product will meet the stated governmental standards and regulations.

On a weight basis of 100 pts of the intermixture, at a liquid chemical loading of 6–16 pts of a 50% concentration aqueous solution, specifically containing mono and di-ammonium phosphate in a 30% to 70% ratio, 0.9 pts monoammonium phosphate and 2.1 pts diammonium phosphate plus 3 pts water are present at 6 pts liquid chemical loading, whereas 2.4 pts monoammonium phosphate and 5.6 pts diammonium phosphate plus 8 pts water are present at 16 pts liquid chemical loading, with the remainder in each case being the cellulosic fiber material less any content of 1–9 pts powdered chemical loading and/or any content of corrosion inhibitor present in the contemplated range of amounts earlier indicated.

Correspondingly, at a liquid chemical loading of 6–16 pts of a 50% concentration aqueous solution, specifically containing mono and di-ammonium phosphate in a more preferred 50% to 50% ratio, 1.5 pts monoammonium phosphate and 1.5 pts diammonium phosphate plus 3 pts water are present at 6 pts liquid chemical loading, whereas 4 pts monoammonium phosphate and 4 pts diammonium phosphate plus 6 pts water are present at 16 pts liquid chemical loading, with the remainder of the intermixture in each case being the cellulosic fiber material less any content of powdered chemical and/or corrosion inhibitor present as aforesaid.

More particularly, at a liquid chemical loading of 6–16 pts of a 50% concentration aqueous solution, specifically containing mono and di-ammonium phosphate in the most preferred 40% to 60% ratio, 1.2 pts monoammonium phosphate and 1.8 pts diammonium phosphate plus 3 pts water are present at 6 pts liquid chemical loading, whereas 3.2 pts monoammonium phosphate and 4.8 pts diammonium phosphate plus 8 pts water ar present at 16 pts liquid chemical loading, with the remainder of the intermixture in each case being the cellulosic fiber material less any content of powdered chemical and/or corrosion inhibitor present as aforesaid.

The corresponding parts proprotionately of mono and di-ammonium phosphate and water at liquid chemical loadings intermediate 6 and 16 pts for a 50% concentration aqueous solution, containing mono and di-ammonium phosphate in a 30% to 70% ratio, a 50% to 50% ratio and preferably at a 40% to 60% ratio, may be readily calculated, as well as those for such intermediate loadings at each such mono to di-ammonium phosphate ratio respectively for corresponding solution concentrations for example including depending on the temperature, 30%, 35%, 40%, 45%, 55%, 60%, 65% and 70% or even 79% concentrations, as the case may be, as the artisan will appreciate, all of which are within the specific contemplation of the present invention. The remainder of the intermixture in each of these instances will be the cellulose fiber material less any content of powdered chemical and/or corrosion inhibitor present as aforesaid.

On a weight basis of 100 pts of the intermixture containing agricultural grade monoammonium phosphate and diammonium phosphate including up to about 2% free acid, typically or principally orthophosphoric and/or sulfuric acid, in the liquid chemical, and optionally 0.05–0.30 pt corrosion inhibitor (SHER-GARD) per part total mono and di-ammonium phosphate present, under highly efficient system conditions of plant equipment installation and operation, especially regarding the liquid chemical spray system, a loose fill fire retardant cellulosic fiber material composite final insulation product of desired bulk density may be produced according to the present invention under the first alternative at ambient temperature which will meet the Federal Specification HHI-515D, using 6 pts liquid chemical and correspondingly about 94 pts cellulosic fiber material, where the liquid chemical is approximately 50% concentration aqueous solution, preferably containing the 3 pts total mono and di-ammonium phosphate in a weight ratio of 40% to 60% in the 3 pts water present.

Similar results may be obtained where the liquid chemical is an approximately 40% concentration aqueous solution, preferably containing the 2.4 pts total mono and di-ammonium phosphate in a like weight ratio of 40% to 60% in the 3.6 pts water present. However, as the system conditions become less efficient, in order to attain the necessary level of fire retardant chemical in the final product, the solution concentration must be increased and/or more liquid chemical per unit weight of the cellulosic fiber material must be utilized.

Accordingly, under less efficient system conditions, in order to meet such Federal Specification, about 8–12 pts liquid chemical may be used and correspondingly about 92–88 pts cellulosic fiber material, where the liquid chemical is an approximately 50% concentration aqueous solution, preferably containing the 4–6 pts total mono and di-ammonium phosphate in a like weight ratio of 40% to 60% in the 4–6 pts water present.

Where the liquid chemical is an approximately 40% concentration aqueous solution, preferably containing the total mono and di-ammonium phosphate in a like weight ratio of 40% to 60% in the water present, it is generally necessary to use about 10–12 pts liquid chemical, i.e. 4–4.8 pts total mono and di-ammonium phosphate and 6–7.2 pts water, and correspondingly about 90–88 pts cellulosic fiber material in order to attain the necessary level of fire retardant chemical in the final product to meet such Federal Specification, although under appropriate system conditions, about 8–10 pts liquid chemical, i.e. 3.2–4 pts total mono and di-ammonium phosphate and 4.8–6 pts water, and correspondingly 92–90 pts cellulosic fiber material, will still suffice.

On the other hand, where the liquid chemical is an approximately 50% concentration aqueous solution, preferably containing the total mono and di-ammonium phosphate in a like ratio of 40% to 60% in the water present it is generally sufficient to use under such less efficient system conditions only about 8–10 pts liquid chemical, i.e. 4–5 pts total mono and di-ammonium phosphate and 4–5 pts water, and correspondingly about 92–90 pts cellulosic fiber material in order to attain the necessary level of fire retardant chemical in the final product to meet such Federal Specification, although under more inefficient system conditions it may be necessary to use about 10–12 pts liquid chemical, i.e. 5–6 pts total mono and di-ammonium phosphate and 5–6 pts water, and correspondingly about 90–88 pts cellulosic fiber material for such purpose.

In each of the foregoing instances, while comparable results can be obtained ideally where the weight ratio of mono to di-ammonium phosphate in the liquid chemical is other than about 40% to 60%, e.g. 50% to 50% or 30% to 70%, less desirable results are usually attained in practice. In the case of a 50% to 50% weight ratio solution, this is because significantly less total ammonium phosphate can be dissolved at a given lower level range temperature than in the case of a 40% to 60% weight ratio solution, and therefore proportionally less fire retardant chemical and more water will be present in the concomitantly lower percent concentration resultant aqueous solution in the intermixture per unit weight of cellulosic fiber material.

On the other hand, in the case of a 30% to 70% weight ratio solution, this is because inherently somewhat less total ammonium phosphate can be dissolved at a given temperature than in the case of a 40% to 60% weight ratio solution, but more importantly because the high relative content of diammonium phosphate renders the solution higher, i.e. basic, in pH. Therefore, not only will proportionally less fire retardant chemical and more water be present in the somewhat lower percent concentration resultant aqueous solution in the intermixture per unit weight of cellulosic fiber material, but also the final product will be prone to possible ammonia release at its end point of use.

Consequently, depending upon the efficiency of the system conditions, in order to meet such Federal Specification, it will usually be necessary where the weight ratio of mono to diammonium phosphate is other than about 40% to 60%, e.g. 50% to 50% or 30% to 70%, to carry out the operation with at least about 8-10 pts liquid chemical and correspondingly about 92-90 pts cellulosic fiber material, and generally about 10-12 pts liquid chemical and correspondingly 90-88 pts cellulosic fiber material.

As the system conditions become more inefficient, the final product obtained may be inadequate in total fire retardant chemical content to meet such Federal Specification, even though it may be of desired bulk density. To bolster the level of total fire retardant chemical content while still carrying out the operation at ambient temperature, the first alternative may be advantageously used conjointly with the second alternative, by adding about 1-9 pts of powdered chemical along with the approximately 6-12 pts liquid chemical, e.g. about 6 pts or about 8-10 pts or about 10-12 pts liquid chemical, to the intermixture with the corresponding remainder of about 93-89 pts cellulosic fiber material, i.e. less the concomitant content of 0.05-0.30 pts corrosion inhibitor included per part total mono and diammonium phosphate present. The addition of the powdered chemical to the intermixture is of course conveniently effected at the second hammermill as earlier noted.

As also previously emphasized, the powdered chemical may be conventional finely divided solid fire retardant material so long as preferably it is not an alkali or alkaline earth and does not have a basic pH in aqueous solution and is otherwise substantially free from constituents which will change the substantially neutral pH condition of the instant mixture of mono and di-ammonium phosphate to a basic or alkaline pH condition, as this will lead to possible ammonia release from the diammonium phosphate content as discussed above.

The substantial avoidance of alkaline reacting powdered chemical materials is desirable even though a corrosion inhibitor is also intended in the usual instance to be included in the final insulation product. This is because the corrosion inhibitor will be present not only to inhibit corrosion which might otherwise be traceable to alkaline reacting materials in the final insulation product, but also to inhibit corrosion traceable to acid reacting materials such as free acid which might be present in the commercial or agricultural grade monoammonium phosphate and diammonium phosphate contemplated as preferred, low cost and readily available sources for the instant fire retardant materials.

In any case, the materials used to provide the final insulation product must fundamentally be such that the final product will be able to meet the contemplated governmental standards and regulations.

It will be appreciated that the amount of powdered chemical to be included will generally be directly dependent on the degree of efficiency of the actual system conditions existing at the particular plant equipment installation, and the degree of over compensating enrichment in terms of added powdered chemical content desired to assure that the final insulation product will safely meet such Federal Specification, while at the same time minimizing costs.

Moreover, since the powdered chemical is included in those cases where the liquid chemical content is insufficient to meet such Federal Specification, due to inefficient system conditions during the production operation, the desired low bulk density of the final insulation product will not be adversely increased. Instead the added content of powdered chemical will merely represent the complemental content of fire retardant chemical generally needed to enrich the otherwise deficient content of the instant mono and di-ammonium phosphate fire retardants in the liquid chemical to provide the necessary total fire retardant chemical content to meet such Federal Specification.

Since the 1-9 pts powdered chemical is deducted from the corresponding content of cellulosic fiber material, in arriving at 100 pts of the intermixture, the total content of chemical fire retardants will increase in relation to the correspondingly decreasing total content of cellulose fiber material, i.e. aside from the water content therein derived from the liquid chemical and aside from the corrosion inhibitor content present. Thus, at 6-12 pts liquid chemical of 50% concentration aqueous solution, containing 3-6 pts mono and di-ammonium phosphate, and 1-9 pts powdered chemical, a total fire retardant chemical content of 4-15 pts will be present in the intermixture with about 93-79 pts cellulosic fiber material, i.e. disregarding the minor content of corrosion inhibitor present, or about 4.3-18.9 pts total fire retardant chemical per 100 pts of cellulosic fiber material. Naturally, the higher the content of liquid chemical used, the lower the content of powdered chemical that will be necessary to meet such Federal Specification.

Under the third alternative, by heating the liquid chemical to increase its percent concentration, not only may 6 pts hot liquid chemical of higher than 50% concentration aqueous solution be used with ease, but also more readily those in which the mono and diammonium phosphate are in a weight ratio of 50% to 50% and 30% to 70% as well as 40% to 60%. Even where the system conditions are less efficient, 8-10 pts or 10-12 pts, or even 12-14 pts or 14-16 pts, hot liquid chemical may be employed. This is because a significantly higher proportion of total mono and di-ammonium phosphate and correspondingly a lower proportion of water will be present, inherently avoiding the undesirable production of a damp or wet mass intermixture of too high a bulk density as might otherwise possibly occur when operating under the first alternative at ambient temperature in a plant equipment installation providing inefficient system conditions.

Nevertheless, even under the more versatile possibilities of using mono and di-ammonium phosphate weight ratios of 50% to 50% and 30% to 70% with ease, in addition to the normally preferred weight ratio of 40% to 60%, at low, e.g. 6 pts, as well as low average, e.g. 8-10 pts, or high average, e.g. 10-12 pts, or above average, e.g. 12-14 pts, or high, e.g. 14-16 pts, liquid chemical loadings, the third alternative may be used conjointly with the second alternative to achieve suitably high total fire retardant liquid chemical and powdered chemical loadings.

Such will assure meeting such Federal Specification, as where the system conditions of the particular plant equipment installation are particularly inefficient. This will normally occur where the spray system is such that the liquid chemical content which can be added to the intermixture is low, e.g. 6 pts, or low average, e.g. 8-10 pts, and in some cases high average, e.g. 1-12 pts.

However, the addition of powdered chemical may also be utilized with favorable results in cases under the third alternative where the liquid chemical content which can be added to the intermixture is above average, e.g. 12-14 pts, or high, e.g. 14-16 pts, such as where the hot liquid chemical is less hot and concomitantly is of lower percent concentration, albeit above the corresponding concentration of the liquid chemical used at ambient temperature under the first alternative.

The fourth alternative will normally only be necessary where under the ambient temperature contemplated the percent concentration aqueous solution is on the low side, e.g. 30% or 40% total mono and di-ammonium phosphate, and a high content of the liquid chemical, e.g. 10-16 pts, must be used to provide sufficient total mono and di-ammonium phosphate fire retardant material per unit weight of the cellulosic fiber material in the intermixture to meet such Federal Specification; and/or where under the ambient temperature contemplated the system conditions are of low efficiency, e.g. even where the percent concentration solution is otherwise sufficient such as in the case of a 50% concentration aqueous solution, and whereupon the intermixture forms a damp pulp or wet mass of impregnated fibers of unacceptably high bulk density.

Such a wet mass, e.g. containing 10-16 pts of 30% concentration aqueous solution (i.e. 3-4.8 pts total mono and di-ammonium phosphate and 7-11.2 pts water) and 90-84 pts cellulosic fiber material; or e.g. containing 10-16 pts of 40% concentration aqueous solution (i.e. 4-6.4 pts total mono and di-ammonium phosphate and 6-9.6 pts water) and 90-84 pts cellulosic fiber material; or even e.g. containing 10-16 pts of 50% concentration aqueous solution (i.e. 5-8 pts total mono and di-ammonium phosphate and 5-8 pts water) and 90-84 pts cellulosic fiber material; may be suitably subjected to a hot air current flow at the second hammermill.

As noted earlier, this may be accomplished by adding about 1 million BTU/hr. to about 3,000 ft$^3$/min. air current flow utilized in conjunction with the overall operation on a calculated rate basis of about 7,000-10,000 lbs/hr total intermixture throughput.

On a weight basis of 100 pts/hr total intermixture throughput, the hot air flow roughly corresponds to 30 ft$^3$/min. or 1,800 ft$^3$/hr and the heat added thereto roughly corresponds to 10,000 BTU/hr or 167 BTU/min. Thus, using about 1,800 ft$^3$/hr hot air heated at the rate of about 10,000 BTU/hr, the intermixture may be dried sufficiently by driving off excess moisture therefrom (derived from the 7-11.2 pts water in the 10-16 pts 30% concentration solution; or from the 6-9.6 pts water in the 10-16 pts 40% concentration solution; or from the 5-8 pts water in the 10-16 pts 50% concentration solution; as the case may be) to a desired loose fill condition of acceptably low bulk density corresponding to a settled bulk density per Federal Specification HHI-515D of substantially between about 2.0-3.1 lbs/ft$^3$, and more particularly substantially between about 2.4-2.7 lbs/ft$^3$ for the final insulation product.

Favorable results are often obtained under the fourth alternative where under the ambient temperature contemplated the liquid chemical loading amounts to about 14-15 pts, e.g. of 50% concentration aqueous solution (i.e. 7-7.5 pts total mono and di-ammonium phosphate and 7-7.5 pts water) in the intermixture with the corresponding 86-85 pts cellulosic fiber material. By applying hot air at the second hammermill to the resulting damp pulp or wet mass of impregnated fibers at a comparable flow rate and with a comparabe addition of heat to such air as aforesaid, similar results are obtained, whereby to provide a final insulation product of acceptable low bulk density corresponding to such a settled bulk density of about 2.4-2.7 lbs/ft$^3$.

Despite the safeguard permitted by the use of hot air under the fourth alternative, depending on the system conditions efficiency, this alternative may still be used in appropriate cases in conjunction with the second alternative, and/or with the third alternative. In this way, not only will more mono and di-ammonium phosphate be added to the intermixture than otherwise, due to the use of a hot saturated higher percent concentration aqueous solution under the third alternative, and the use of much higher liquid chemical loading of such more concentrated solution under the fourth alternative, coupled with partial water removal by hot air current flow drying at the second hammermill, but also the intermixture will be enriched by the amount of powdered chemical added under the second alternative at the second hammermill, as the case may be.

OPERATING EXAMPLES

The following specific operating examples are set forth to illustrate without limitation the various aspects of the present invention, all parts and percentages being by weight except where otherwise indicated.

Example 1 (a)—Production of Solid Form Mixture (Tablets)

The compacted composite solid pelletized dosage articles or tablets contemplated according to the present invention are suitably prepared on a 10 part basis by grinding 4 parts by weight of ⅛ inch balls of commercial or agricultural grade monoammonium phosphate and 6 parts by weight or ⅛ inch balls of commercial or agricultural grade diammonium phosphate, separately or together, to a fine particle size typically below about 200 mesh (i.e. below about 0.074 mm). If grinded separately, the two particle fractions are then blended in a 10 part by weight ratio of 4 parts monoammonium phosphate and 6 parts diammonium phospate.

In either case, 0.5-3.0 parts by weight of a corrosion inhibitor, typically SHER-GARD (Sherman-Williams Co.), per 10 parts by weight total monoammonium phosphate and diammonium phosphate present are blended into the resulting finely divided solid mixture, and the resulting blend is fed to a conventional briquetting machine at ambient temperature and molded into almond shaped and sized tablets or pellets at a pressure above about 2,000 psi in conventional manner.

The resulting almond shaped and sized compacted composite solid pelletized article form tablets are generally about 4 cm. long, 2.5 cm. wide and 1 cm. thick, and weigh approximately 20 grams each, providing a convenient dosage unit size for handling, measuring and dissolving to form aqueous solutions of fairly accurate concentrations with respect to monoammonium phosphate and diammonium phosphate content. Of course, any other appropriate shape and size of tablet, pellet, lozenge, briquette, etc. may be provided in this regard as desired, as the artisan will appreciate.

The resulting tablets constitute a water-compatible intimate and uniform fire retardant mixture composed of divided particles of generally below about 200 mesh average size in compacted composite solid pelletized dosage article form, which mixture is substantially free from water-insoluble ingredients such as finely divided glass particles and from finely divided water-soluble active chemical materials such as alkali, alkaline earth or other basic materials, including ammonia-liberating basic materials, i.e. other than monoammonium phosphate and diammonium phosphate. The tablet form mixture has a substantially netural pH when dissolved in aqueous solution, and contains in a ratio by weight substantially about 40% monoammonium phosphate and 60% diammonium phosphate and at most up to about 2% free acid, i.e. free mineral acid such as orthophosphoric acid and/or sulfuric acid depending upon the relative degree of purity of the source of the monoammonium phosphate and diammonium phosphate used to provide the solid form mixture. pg,85

Example 1 (b)—Preparation of Solution Form Mixture (Liquid Chemical)

A 50% by weight aqueous solution is prepared by dissolving on a 20 part by weight basis 4 of monoammonium phosphate and 6 parts of diammonium phosphate, each of agricultural grade containing at most up to 2% total free orthophosphoric acid and sulfuric acid, in 10 pts of water under stirring at ambient temperature. To this solution, 0.5–3.0 pts by weight of a corrosion inhibitor, typically SHER-GARD (Sherman Williams Co.), are added.

This 50% by weight aqueous solution may be optionally prepared by dissolving on a weight basis 10 pts of the tablets produced according to the foregoing procedure of Example 1 (a) in 10 pts of water under stirring at ambient temperature.

In either case, a trace amount of about 0.02 pt by weight of the surfactant TRITON X-100 (Rohm & Haas Co.), i.e. about 0.1% by weight based on the weight of the solution, is added to the foregoing 20 parts by weight of resulting 50% solution.

Example 1 (c)—Production of Fire Retardant Cellulosic

Insulation Product

Recycled newspaper, which ultimately forms the loose fibers of cellulosic fiber material, is continuously fed to a first hammermill under a spray of the liquid chemical (50% aqueous solution) prepared according to the foregoing procedure of Example 1 (b) in an appropriate ratio by weight and at an appropriate throughput rate to assure adequate wetting and impregnation of the newspaper by the liquid chemical and uniform distribution of the liquid chemical throughout the newspaper as it enters the hammermill. The liquid chemical is continuously sprayed onto the newspaper under an elevated pump delivery pressure of about 180 psi from spray nozzles located at many points across the path of the incoming newspaper.

The newspaper is subjected to mechanical percussion in the first hammermill for pulverizing it into a cellulose pulp or mass of fibers of cellulosic material, and at the same time the liquid chemical is intimately contacted with, distributed into and uniformly intermixed with the individual fibers and is absored therein, all under a constant air current flow at a rate corresponding to about 3,000 ft$^3$/min., i.e. 180,000 ft$^3$/hr., per approximatey 7,000 to 10,000 lbs. intermixture throughput/hr.

After an average residence time of about 1–4 seconds in the first hammermill, the air current flow blows the pulp or damp mass of resultant liquid chemical impregnated fibers into a paper fiber bin or collection zone from which it is continuously fed by a conveyor screw or auger to a second hammermill in which the pulverizing of the mass is continued to attain a final loose fill condition of the fibers, here also under a second constant air current flow at said rate corresponding to about 3,000 ft$^3$/min., i.e. 180,000 ft$^3$/hr., per approximately 7,000 to 10,000 lbs. intermixture throughput/hr.

After a like average residence time of about 1–4 seconds in the second hammermill, the second air current flow blows the final mass of resultant liquid chemical impregnated loose fill fibers into a bagging bin or bagging zone from which it is bagged by a bagger device in conventional manner. The liquid chemical is thus combined with the fibers of the cellulosic material in the form of a composite loose fill fiber insulation product in which the monoammonium phosphate and diammonium phosphate are associated together more or less in a definite ratio relationship to each other and in uniform distribution in situ throughout the cellulosic material and in effective intimate fire retardant association with the corresponding fibers thereof, i.e. absorbed within the cellulose fiber itself.

Where the optional feature of adding an enriching additive amount of a finely divided solid supplemental fire retardant material of the conventional type (powdered chemical) is employed, the powdered chemical in an average particle size of predominantly below about 200 mesh is continuously fed by a second conveyor screw or auger to the second hammermill simultaneously with the mass of liquid chemical impregnated fibers fed by the first conveyor screw thereto and in an appropriate ratio by weight and at an appropriate throughput rate to achieve inclusion of the desired amount of powdered chemical in the final mass blown to the bagging bin. During the 1–4 second average residence time of the mass in the second hammermill, the powdered chemical is correspondingly intimately contacted with, distributed among and uniformly intermixed physically with the adjacent individual fibers, so that the individual particles of the powdered chemical are in uniform distribution in the mass and in intimate in situ entwined association as solid particles with the adjacent fibers of the cellulosic material.

It will be appreciated that care must be taken that the spray nozzles and individual sprays of injected liquid chemical are positioned so as not to interfere with the production operation and specifically of the flow of the newspaper to the first hammermill. Thus, the farther away from the bagger device (where the end product or final composite loose fill fiber material is bagged before sale) that the liquid chemical is injected into the system, the more will be the amount of liquid chemical which can be used in a given plant installation.

The reason for this is that during the processing of the newspaper into cellulose, i.e. pulverizing into fibers, heat is generated in the hammermills which causes partial evaporation of water from the liquid chemical (aqueous solution), and also the blowing of the pulp mass and fibers by the corresponding air current flows similarly causes partial evaporation of such water, both of which have a drying effect on the pulp or liquid chemical impregnated fiber mass.

Hence, by proper positioning of the spray nozzle arrangement and adjustment of the flow concentration of the liquid chemical spray, considering such drying effect, a balance may be obtained whereby sufficient liquid chemical may be favorably applied to the fibers to obviate the need for employing an enriching additive amount of the powdered chemical, or a heated, more concentrated, liquid chemical, or the use of heat to heat such air current flow.

The water loss in the product from the point of introduction of the spray to the bagging of the final product may range from about 20–100% of the total water in the liquid chemical. This water loss is typically about 70-80% of the total water, e.g. where air at ambient temperature rather than heated air is used as the air current flow.

Thus, depending on the efficiency of the liquid spray injection system and the location of the spray nozzles, the use of liquid chemical alone is satisfactory for the production of final composite loose fill cellulosic material fiber insulation products which will meet governmental standards and regulations, and in particular Federal Specification HHI-515D. In this regard, various liquid chemical loadings alone, e.g. of at least about 6%, usually about 8 or 10%, or between about 8–14%, and even up to 16%, by weight of the intermixture can yield via the aforedescribed production process such a government approvable insulation product, e.g. where the liquid chemical by weight is a 50% or higher aqueous solution, preferably of the ratio by weight of 40% monoammonium phosphate and 60% diammonium phosphate.

However, where the application of the liquid chemical at a given percent concentration to the newspaper is less efficient or even particularly inefficient, as often occurs because of the complexity and high cost associated with the attainment and continous ongoing operation of more or less perfectly functioning spray systems in practice in industrial scale manufacturing operations, the use of the liquid chemical alone will not suffice in most cases to achieve an insulation product which will meet the aforesaid Federal Specification. Consequently, in these instances, the optional use of an enriching additive amount of the powdered chemical as finely divided solid supplemental fire retardant material is employed in connection with the second hammermill operation.

Such operation is not significantly influenced either in terms of the 1–4 second average residence time of the cellulosic material mass or in terms of the degree or quality of the pulverizing effect of the liquid chemical impregnated fibers in the second hammermill by reason of the additional presence therein of such powdered chemical, nor does the presence of such powdered chemical in addition to the liquid chemical adversely affect or influence the physical properties, and especially the bulk density, of the final composite loose fill fiber insulation product.

In this regard, as noted above small amounts of conventional powdered chemical, e.g. of about 1-9% by weight of the final composite product, are sufficient to enrich the fibers enough to meet such Federal Specification, whether such powdered chemical is for instance boric acid alone or a mixture by weight of 1 pt boric acid and 2 pts ammonium sulfate or having any ratio of boric acid to ammonium sulfate of less than 1 to 2 or even greater than 1 to 2, or another powdered chemical material such as aluminum sulfate, aluminum hydroxide, monoammonium phosphate and/or diammonium phosphate.

Because under certain conditions these conventional powdered chemicals can be corrosive, it must be emphasized at this point that it is recommended and thus preferred that the use of these powdered chemicals be accompanied in the final composite fiber insulation product by a corrosion inhibitor. As noted earlier, such corrosion inhibitor may be favorably included either in the precursor tablet formulation as described in Example 1(a) or in the liquid chemical as described in Example 1(b). Even where the inclusion of the powdered chemical is omitted, the corrosion inhibitor is still recommended and thus preferred as an inclusion in the final insulation product as where the monoammonium phosphate and diammonium phosphate fire retardant liquid chemical is derived from an agricultural grade or other less than completely chemically pure source and consequently contains a residual content, e.g. up to 2% by weight, of free acid.

Generally, therefore, on a weight basis liquid chemical loading of about 6–16%, and optionally powdered chemical loadings of about 1-9%, may be used for achieving fire retardancy which will meet the foregoing government standards, with the remainder being the cellulosic fiber material and any corrosion inhibitor included, of course suitably adjusted for any water removed from the system during the operation by the mechanical heat generated during the hammermill pulverizing and by the air current flow applied to the fiber mass.

Where it is desired to adjust more completely the water content in the final composite loose fill fiber insulation product collected in the bagging bin or bagging zone, the air current flow applied to the mass at the second hammermill may of course be heated by simply adding heat for example at a rate corresponding to about one million BTU/hr. per 180,000 ft$^3$ air/hr. per approximately 7,000 to 10,000 lbs intermixture throughput/hr. (e.g. generated by a propane fired Salamandar type burner) to the air flow ducting upstream of the second hammermill.

Example 2

(a) Following the procedure of Example 1(c), 960 lbs/hr of liquid chemical at ambient temperature (about 20° C.), in the form of a 50% aqueous solution containing 192 lbs monoammonium phosphate and 288 lbs diammonium phosphate (40:60 ratio) and 480 lbs water, and containing a trace amount (0.1%) of a surfactant (TRITON X-100), are sprayed onto 8,600 lbs/hr of newspaper being fed to the first hammermill, and after an average residence time of 1-4 seconds in the first hammermill under the constant application of air current flow thereto at the rate of 3,000 ft$^3$/min. or 180,000 ft$^3$/hr, the resulting intermixture is blown from the first hammermill to a paper bin and thence fed by a fiber screw conveyor to the second hammermill simultaneously with the feeding of 384 lbs/hr of powdered chemical, i.e. boric acid, by a powder screw conveyor thereto, and after an average residence time of 1-4 seconds in the second hammermill under the constant application of a separate air current flow thereto at a rate of 3,000 ft$^3$/min. or 180,000 ft$^3$/hr, the resulting mass of liquid chemical impregnated and powdered chemical intermixed and entwined paper fibers is blown from the second hammermill to a bagging bin and bagged at the rate of 240 thirty lb. bags/hr. to provide 9,600 lbs/hr of final insulation product having a bulk density corresponding to a settled bulk density per Federal Specification HHI-515D of about 2.4–2.7 lbs/ft$^3$. The final product contains about 5% total mono and di-ammonium phosphate and 4% boric acid, or a total of about 9% fire retardant chemical. About 369 lbs/hr (about 76.9%) of the water in the starting liquid chemical are lost during the operation. The powdered chemical is used in an average particle size predominantly below about 200 mesh.

(b) Example 2(a) is repeated, but this time using 8,400 lbs/hr of newspaper and 576 lbs/hr of a mixture form powdered chemical, i.e. 192 lbs boric acid and 384 lbs ammonium sulfate (1:2 ratio), rather than 384 lbs/hr boric acid alone as in Example 2(a), and the resulting product is bagged at the same rate to provide 9,600 lbs/hr of final insulation product having approximately the same said bulk density. The final product in this instance contains about 5% total mono and di-ammonium phosphate and 6% total boric acid and ammonium sulfate, or a total of about 11% fire retardant chemical. About 361 lbs/hr (about 75.2%) of the water in the starting liquid chemical are lost during the operation. The powdered chemical is used in an average particle size predominantly below about 200 mesh.

(c) Example 2(b) is repeated, but this time using 612 lbs/hr of liquid chemical at ambient temperature (about 20° C.), in the form of a 50% aqueous solution containing 122.4 lbs monoammonium phosphate and 183.6 lbs diammonium phosphate (40:60 ratio) and 306 lbs water, and containing said trace amount of said surfactant, as a spray, 6500 lbs/hr of newspaper, and 238 lbs of mixture form powdered chemical, i.e. 79.33 lbs boric acid and 158.67 lbs ammonium sulfate (1:2 ratio), and the resulting product is bagged at the same rate to provide in this instance 7,200 lbs/hr of final insulation product having approximately the same said bulk density. The final product in this instance contains about 4.25% total mono and di-ammonium phosphate and 3.3% total boric acid and ammonium sulfate, or a total of about 7.55% or 8% fire retardant chemical. About 232 lbs/hr (about 75.8%) of the water in the starting liquid chemical are lost during the operation. The powdered chemical is used in an average particle size predominantly below about 200 mesh.

(d) Example 2(a) is repeated, but this time with the additional inclusion of 25 lbs of a corrosion inhibitor (SHER-GARD) in the spray, and the same concomitant resultant corrosion inhibited final insulation product is obtained.

(e) Example 2(b) is repeated, but this time with the additional inclusion of 25 lbs of a corrosion inhibitor (SHER-GARD) in the spray, and the same concomitant resultant corrosion inhibited final insulation product is obtained.

(f) Example 2(c) is repeated, but this time with the additional inclusion of 25 lbs of a corrosion inhibitor (SHER-GARD) in the spray, and the same concomitant resultant corrosion inhibited final insulation product is obtained.

(g) Example 2(a) is repeated, but this time with the addition of about 16,667 BTU/min. or 1 million BTU/hr to the air current flow applied to the second hammermill and the resultant product is obtained with a concomitantly reduced moisture content.

(h) Example 2(b) is repeated, but this time with the addition of about 16,667 BTU/min. or 1 million BTU/hr to the air current flow applied to the second hammermill and the resultant product is obtained with a concomitantly reduced moisture content.

(i) Example 2(c) is repeated, but this time with the addition of about 16,667 BTU/min. or 1 million BTU/hr to the air current flow applied to the second hammermill and the resultant product is obtained with a concomitantly reduced moisture content.

(j) Example 2(d) is repeated, but this time with the addition of about 16,667 BTU/min. or 1 million BTU/hr to the air current flow applied to the second hammermill and the resultant product is obtained with a concomitantly reduced moisture content.

(k) Example 2(e) is repeated, but this time with the addition of about 16,667 BTU/min. or 1 million BTU/hr to the air current flow applied to the second hammermill and the resultant product is obtained with a concomitantly reduced moisture content.

(l) Example 2(f) is repeated, but this time with the addition of about 16,667 BTU/min. or 1 million BTU/hr to the air current flow applied to the second hammermill and the resultant product is obtained with a concomitantly reduced moisture content.

(m) Example 2(a) is repeated, but this time using 9.76 pts/hr of liquid chemical at ambient temperature (about 20° C.), in the form of a 50% aqueous solution containing 1.95 pts monoammonium phosphate and 2.93 pts diammonium phosphate (40:60 ratio) and 4.88 pts water, and containing a trace amount (0.1%) of surfactant (TRITON X-100), and additionally containing 0.25 pts of a corrosion inhibitor (SHER-GARD), as the spray (total spray 10.01 pts/hr) which is sprayed onto 86 pts/hr of newspaper being fed to the first hammermill, and after an average residence time of 1–4 seconds in the first hammermill under the constant application of air current flow thereto at the rate of 30 ft$^3$/min. or 1800 ft$^3$/hr, the resulting intermixture is blown from the first hammermill to the paper bin and thence fed by the fiber screw conveyor to the second hammermill simultaneously with the feeding of 4 pts/hr of powdered chemical, i.e. boric acid, by the powder screw conveyor thereto, and after an average residence time of 1–4 seconds in the second hammermill under the constant application of a separate air current flow thereto at a rate of 30 ft$^3$/min. or 1,800 ft$^3$/hr, the resulting mass of liquid chemical impregnated and powdered chemical intermixed and entwined paper fibers is blown from the second hammermill to a bagging bin and bagged at the rate of about 2.4 thirty-one hundredth pt bags/hr. to provide about 100 pts/hr of final insulation product having a bulk density corresponding to a settled bulk density per Federal Specification HHI515D of about 2.4–2.7 lbs/ft$^3$. The final product contains about 4.88% total mono and di-ammonium phosphate and 4% boric acid, or a total of about 8.88% or 9% fire retardant chemical. About 3.66 pts/hr (about 75.0%) of the water in the starting liquid chemical are lost during the operation. The powdered chemical is used in an average particle size predominantly below about 200 mesh.

(n) Example 2(m) is repeated, but this time using 84 pts/hr of newsprint and 6 pts/hr of a mixture form powdered chemical, i.e. 2 pts boric acid and 4 pts ammonium sulfate (1:2 ratio), rather than 86 pts/hr of newsprint and 4 pts/hr boric acid alone as in Example 2(m), and the resulting product is bagged at the same rate to provide about 100 pts/hr of final insulation product having approximately the same said bulk density. The final product in this instance contains about 4.88% total mono and di-ammonium phosphate and 6% total boric acid and ammonium sulfate, or a total of about 10.88% or 11% fire retardant chemical. About 3.66 pts/hr (about 75.0%) of the water in the starting liquid chemical are lost during the operation. The powdered chemical is used in an average particle size predominantly below about 200 mesh.

(o) Example 2(n) is repeated, but this time using 7.5 pts/hr of liquid chemical at ambient temperature (about 20° C.), in the form of a 50% aqueous solution containing 1.5 pts monoammonium phosphate and 2.25 pts diammonium phosphate (40:60 ratio) and 3.75 pts water, and containing said trace amount of said surfactant, and additionally containing 1.0 pts of said corrosion inhibitor, as the spray (total spray 8.5 pts/hr) which is sprayed onto 88.2 pts/hr of newspaper being fed to the first hammermill, and after an average residence time of 1–4 seconds in the first hammermill under the constant application of air current flow thereto at the rate of about 30 ft$^3$/min. or 1,800 ft$^3$/hr, the resulting intermixture is blown from the first hammermill to the paper bin and thence fed by the fiber screw conveyor to the second hammermill simultaneously with the feeding of 3.3 pts/hr of a mixture form powdered chemical, i.e. 1.1 pts boric acid and 2.2 pts ammonium sulfate, rather than 6 pts/hr of such mixture as in Example 2(n), by the powder screw conveyor thereto, and after an average residence time of 1–4 seconds in the second hammermill under the constant application of a separate air current flow thereto at a rate of about 30 ft$_3$/min. or 1,800 ft$_3$/hr, the resulting mass of liquid chemical impregnated and powdered chemical intermixed and entwined paper fibers is blown from the second hammermill to the bagging bin and bagged at the rate of about 2.4 thirty-one hundreth pt bags/hr to provide about 100 pts/hr of final insulation product having a bulk density corresponding to a settled bulk density per Federal Specification HHI-515D of about 2.4–2.7 lbs/ft$^3$. The final product contains about 3.75% total mono and di-ammonium phosphate and 3.3% total boric acid and ammonium sulfate, or a total of about 7.05% or 7% fire retardant chemical. About 2.8 pts/hr (about 74.1%) of the water in the starting liquid chemical are lost during the operation. The powdered chemical is used in an average particle size predominantly below about 200 mesh.

(p) Example 2(m) is repeated, but this time omitting the inclusion of any powdered chemical, and using 13.5 pts/hr of liquid chemical at ambient temperature (about 20° C.) in the form of a 50% aqueous solution containing 2.7 pts monoammonium phosphate and 4.05 pts diammonium phosphate (40:60 ratio) and 6.75 pts water, and containing said trace amount of said surfactant, and additionally containing 0.5 pt of said corrosion inhibitor, as the spray (total spray 14 pts/hr) which is sprayed onto 86 pts/hr of newspaper being fed to the first hammermill, and after an average residence time of 1–4 seconds in the first hammermill under the constant application of air current flow thereto at the rate of about 30 ft$^3$/min. of 1,800 ft$^3$/hr, the resulting intermixture is blown from the first hammermill to the paper bin and thence fed by the fiber screw conveyor to the second hammermill, and after an average residence time of 1–4 seconds in the second hammermill under the constant application of a separate air current flow thereto at a rate of about 30 ft$^3$/min. or 1,800 ft$^3$/hr, the resulting mass of liquid chemical impregnated fibers is blown from the second hammermill to the bagging bin and bagged at the rate of about 2.4 thirty-one hundreth pt bags/hr to provide about 100 pts/hr of final insulation product having a bulk density corresponding to a settled bulk density per Federal Specification HHI-515D of about 2.4–2.7 lbs/ft$^3$. The final product contains about 6.75% or 7% total mono and di-ammonium phosphate as total fire retardant chemical. About 5.0 pts/hr (about 74.1%) of the water in the starting liquid chemical are lost during the operation.

(q) Example 2(m) is repeated, but this time with the addition of about 167 BTU/min. or 10,000 BTU/hr to the air current flow applied to the second hammermill and the resultant product is obtained with a concomitantly reduced moisture content.

(r) Example 2(n) is repeated, but this time with the addition of about 167 BTU/min. or 10,000 BTU/hr to the air current flow applied to the second hammermill and the resultant product is obtained with a concomitantly reduced moisture content.

(s) Example 2(o) is repeated, but this time with the addition of about 167 BTU/min. or 10,000 BTU/hr to the air current flow applied to the second hammermill and the resultant product is obtained with a concomitantly reduced moisture content.

(t) Example 2(p) is repeated, but this time with the addition of about 167 BTU/min. or 10,000 BTU/hr to the air current flow applied to the second hammermill and the resultant product is obtained with a concomitantly reduced moisture content.

(u) Example 2(p) is repeated, but this time using 13.5 pts/hr of hot concentrated liquid chemical at about 60° C. (140° F.), in the form of a 65% aqueous solution containing 3.510 pts monoammonium phosphate and 5.265 pts diammonium phosphate (40:60 ratio) and 4.725 pts water, and containing said trace amount of said surfactant, and additionally containing 0.5 pt of said corrosion inhibitor, as the spray (total hot spray 14 pts/hr) which is sprayed onto 86 pts/hr of newspaper being fed to the first hammermill, and the resulting product is bagged at the same rate to provide about 100 pts/hr of final insulation product having approximately the same bulk density. The final product in this instance contains about 8.775% or 9% total mono and di-ammonium phosphate as total fire retardant chemical. About 3.5 pts/hr (about 74.1%) of the water in the starting liquid chemical are lost during the operation.

(v) Example 2(u) is repeated, but this time with the addition of about 167 BTU/min. or 10,000 BTU/hr to the air current flow applied to the second hammermill and the resultant product is obtained with a concomitantly reduced moisture content.

(w) Example 2(u) is repeated, but this time using 82.7 pts/hr of newsprint and including 3.3% mixture form powdered chemical according to Example 2(o), such that 13.5 pts/hr of hot concentrated liquid chemical at about 60° C. (140° F.), in the form of a 65% aqueous solution containing 3.510 pts monoammonium phosphate and 5.265 pts diammonium phosphate (40:60 ratio) and 4.725 pts water, and containing said trace amount of said surfactant, and additionally containing 0.5 pt of said corrosion inhibitor, are sprayed (total hot spray 14 pts/hr) onto 82.7 pts/hr of newsprint being fed to the first hammermill, and after an average residence time of 1–4 seconds in the first hammermill under the constant application of air current flow thereto at the rate of about 30 ft$^3$/min. or 1,800 ft$^3$/hr, the resulting intermixture is blown from the first hammermill to the paper bin and thence fed by the fiber screw conveyor to the second hammermill simultaneously with the feeding of 3.3 pts/hr of a mixture form powdered chemical, i.e. 1.1 pt boric acid and 2.2 pts ammonium sulfate by the powder screw conveyor thereto, and after an average residence time of 1–4 seconds in the second hammermill under the constant application of a separate air current flow thereto at a rate of about 30 ft$^3$/min. or 1,800 ft$^3$/hr, the resulting mass of liquid chemical impregnated and powdered chemical intermixed and entwined paper fibers is blown from the second hammermill to the bagging bin and bagged at the rate of about 2.4 thirty-one hundreth pt bags/hr to provide about 100 pts/hr of final insulation product having a bulk density corresponding to a settled bulk density per Federal Secpification HHI-515D of about 2.4–2.7 lbs/ft$^3$. The final product contains about 8.775% total mono and di-ammonium phosphate and 3.3% total boric acid and ammonium sulfate, or a total of about 12.075% or 12% fire retardant chemical. About 3.5 pts/hr (about 74.1%) of the water in the starting liquid chemical are lost during the operation. The powdered chemical is used in an average particle size predominantly below about 200 mesh.

(x) Example 2(w) is repeated, but this time with the addition of about 167 BTU/min. or 10,000 BTU/hr to the air current flow applied to the second hammermill and the resultant product is obtained with a concomitantly reduced moisture content.

In each of the above examples in which powdered chemical is included, at least about 80% by weight of the finely divided solid particles thereof have an average particle size below about 200 mesh (i.e. below about 0.074 mm), and the remaining at most about 20% by weight of such particles in turn have an average particle size below about 4 mesh (e.g. below about 3.30 mm) and above about 200 mesh and generally predominantly below about 100 mesh (i.e. below about 0.15 mm) and above about 200 mesh. Where the powdered chemical includes more than one component, e.g. boric acid and ammonium sulfate, the particles thereof are used in intimate admixture.

In each of such examples in which powdered chemical is included in the final insulation product, the particles of such powdered chemical are in intimate contact with, intimately distributed among and substantially uniformly intermixed physically with the adjacent individual fibers, such that the individual particles of the powdered chemical are in uniform distribution in the loose fill mass and in intimate in situ entwined association as solid particles with the adjacent fibers of the cellulosic material constituted by the hammermill pulverized newspaper.

In the case of all of the above examples, the liquid chemical is combined with the fibers of such cellulosic material in the form of a composite loose fill fiber insulation product in which the monoammonium phosphate and diammonium phosphate are associated together more or less in a definite ratio relationship to each other and in uniform distribution in situ throughout the cellulosic material and in effective intimate fire retardant association with the corresponding fibers thereof, i.e. impregnated or absorbed within the cellulose fiber itself.

Besides having a bulk density corresponding to a settled bulk density of about 2.4–2.7 lbs/ft$^3$, per Federal Specification HHI-515D the final insulation product produced according to each of the above examples has the following characteristics: Odor: Non-detectable; Corrosion: Nil; Critical Radiant Flux: 0.13–0.23; Smolder: Less than 15%, typically 1%; Fungal Growth: Less than or equal to test standard; Moisture Absorption: Less than 15%; Thermal Resistance Value: 3.5–3.8.

PROCESS VARIATIONS

It will be appreciated that other means than hammermills may be used for achieving the pulping or pulverizing of the newspaper or other source of preferably waste or recycled cellulosic fiber material contemplated herein, so long as the desired loose fill condition and low bulk density characteristics sought are attainable.

Moreover, the newspaper or other cellulosic fiber material used may be provided in prepulped or prepulverized condition or the liquid chemical may be first added to the pulverized cellulosic material after it has entered the first hammermill and/or after it has left the first hammermill and/or after it has entered the second hammermill, whether or not powdered chemical is to be included in the formulation.

However, for all of the earlier stated reasons, it is recommended and indeed preferred to add the liquid chemical by spraying it onto the cellulosic material before and/or as it enters the first hammermill for maximum efficiency in attaining a more complete selective dosaging of the cellulosic material with the desired amounts of the liquid chemical as early in the production operation as possible as well as a more uniform and complete distribution of the entirety of the liquid chemical throughout the cellulosic material per unit time, especially in terms of the desired purpose of meeting pertinent governmental standards and regulations.

Similarly; the powdered chemical where included may be first added to the cellulosic fiber material before and/or as it enters the first hammermill and/or to the pulverized cellulosic material after it has entered the first hammermill and/or after it has left the first hammermill and before it has entered the second hammermill.

However, here also it is recommended and indeed preferred to add the powdered chemical to the cellulose material in the second hammermill, i.e. after such cellulose material has been wetted or impregnated by the spray of liquid chemical and in turn pulverized in the first hammermill for maximum efficiency in attaining a more complete selective dosaging of the cellulosic material with the desired amount of the liquid chemical as early in the production operation as possible as well as a more uniform and complete distribution of the entirety of the liquid chemical throughout the cellulosic material per unit time, in a manner undisturbed by the premature presence of the powdered chemical in the intermixture prior to adequate preliminary pulping and liquid chemical impregnation.

Aside from the extra load on the first hammermill consequent the unrecommended adding of the powdered chemical at the point or earlier, and the cumbersome procedure of adding the powdered chemical to the cellulosic material after leaving the first hammermill and before entering the second hammermill as compared with the more versatile adding of the powdered chemical directly to the second hammermill, the adding of the powdered chemical before or with the spraying of the liquid chemical onto the cellulose fiber material will per se detract from the integrity of the liquid chemical and its degree of maximum permitted wetting and impregnation of the cellulosic material, and especially the absorbing of the liquid chemical within the individual fibers.

Thus, premature inclusion of the powdered chemical will tend to disturb the desired ratio relationship between the mono and di-ammonium phosphate in the liquid chemical and the solution concentration thereof.

It will be appreciated that the foregoing disadvantages attendant the premature inclusion of the powdered chemical in the intermixture apply not only to the usual contemplated supplemental fire retardant materials such as boric acid, ammonium sulfate, aluminum sulfate and/or aluminum hydroxide, but also in general to finely divided solid monoammonium phosphate and/or diammonium phosphate.

This is because the dissolution of such powdered chemical form of mono and/or di-ammonium phosphate will equally disturb the desired ratio relationship between the mono and diammonium phosphate in the liquid chemical and create an imbalance in such ratio relationship with the above noted undesired results. Indeed, the purpose of including the powdered chemical in the first place is only to assure that the final insulation product contains sufficient total fire retardant chemical to meet the pertinent governmental standards and regulations.

Nevertheless, as the artisan will appreciate, should the powdered chemical constitute per se a finely divided solid form intimate admixture of mono and di-ammonium phosphate, such as that precursor blend used for production of the solid form mixture tablets according to Example 1(a) above, within the ratio range of mono and di-ammonium phosphate contemplated herein, then of course the same may be used at any point in the system during the production operation, although still preferably by adding such powdered chemical at the second hammermill, especially so as not to overload the first hammermill.

In this regard, of course, the particular ratio of mono and di-ammonium phosphate in the blend of powdered chemical must be such that upon intermixing with the cellulosic fiber m:aterial and the liquid chemical, the overall resultant intermixture will still contain the dissolved or liquid chemical content of the mono and di-ammonium phosphate therein, within the ratio range as contemplated herein.

Furthermore, consistent with the foregoing, it will be appreciated that the system may include only one hammermill, such as where the same is particularly efficient and/or the throughput rate is comparatively low, or where no powdered chemical is to be included. Likewise, the system may include more than two hammermills, whether powdered chemical is to be included or not, such as where it is desired to achieve at a given throughput more intense or complete pulverizing of the fibers and/or intermixing thereof with the liquid chemical and/or successively with the liquid chemical and thence with the powdered chemical. Such features, naturally, will depend on the degree of efficiency of the particular plant equipment installation and concomitant cost considerations.

Thus, it will be seen that according to the present invention, depending on the efficiency of the system conditions and the plant equipment installation, favorable composite loose fill fiber insulation products may be produced under the first alternative with sufficient fire retardant chemical absorbed within the fibers thereof to meet contemplated governmental standards and regulations and at a desired low bulk density at low unit cost.

In cases of inefficiency, leading to a final product which is otherwise deficient in the desired level of fire retardant chemical, this can be remedied under the second alternative by convenient addition of powdered chemical to the extent necessary to attain such desired level, and/or under the third alternative by use of a more concentrated, e.g. hot saturated, solution as the liquid chemical for such purposes.

In cases of inefficiency, leading to a final product which is otherwise damp or overloaded with moisture derived from the water content in the liquid chemical used, and thus objectionably dense or undesirably excessively high in bulk density, e.g. a fiber mass having a consistency comparable to wet papier mache, this can be remedied under the fourth alternative by convenient addition of heat to the air current flow applied at the second hammermill to the extent necessary to drive off the excessive water content therefrom so as to attain the desired low bulk density and concomitant acceptable level of moisture therein consistent with such low bulk density.

Versatile combinations of two or more of such alternatives may therefore be advantageously used according to the present invention, such that high ratios of liquid chemical to cellulosic fiber material may be achieved at ambient temperature of the liquid chemical under the first alternative and at elevated temperature of the liquid chemical under the third alternative; such that higher contents of mono and di-ammonium phosphate in the total liquid chemical used, and in turn higher ratios of mono and di-ammonium phosphate to cellulose fiber material may be achieved at elevated temperature of the liquid chemical under the third alternative; such that higher contents of water in the total liquid chemical used, and in turn higher ratios of water to cellulosic fiber material may be achieved coupled with the driving off of excessive water by the applying of heated air to the resulting intermixture under the fourth alternative; and such that in addition to or exclusive of the third and fourth alternatives, as the case may be, the total content of fire retardant chemical may be increased by the simple addition of an enriching amount of finely divided solid supplemental fire retardant to the intermixture under the second alternative.

Naturally, since a primary aim and purpose of the present invention is to provide mono and di-ammonium phosphate in specific ratio range combination as a cheap source, though highly effective fire retardant, liquid chemical impregnant for the cellulosic fiber material, the use of the generally more expensive powdered chemical is only contemplated where needed to assure that the final product will meet governmental standards and regulations.

Understandably, since the overall production operation generally contemplates the use of an air current flow applied at each hammermill stage as well as the development of autogenous mechanical heat from the percussion action of the hammermills on the intermixture, these two dependent factors will inherently provide a constant level of drying effect on the intermixture, whereby a more or less constant portion of the water content derived from the liquid chemical will be predictably evaporated by such heat and by such air flow.

While an increase in the amount of such air flow will accordingly determine the degree of any corresponding increase in water loss from the intermixture per unit time and per unit weight of cellulosic fiber material, due to the practical limits of this factor and the practical limitations and degree of efficiency of the plant installation equipment, it will be appreciated that this factor will generally not be sufficient to control the water content in the final product so as to prevent under all contemplated system conditions the production of damp pulp or wet fiber mass intermixtures of undesirably dense nature or objectionably high bulk density.

It is for this reason that the fourth alternative is employed, since the addition of heat to the air flow applied to the second hammermill permits versatile adjustment and control of the degree of water content driven off from the product and in turn that retained in the final product, more or less independently of the other process conditions and even of the rate of flow of such air. This is because, for any given rate of air flow, its temperature may be independently increased by adding heat thereto in any appropriate amount under the fourth alternative, whereby to accomplish the corresponding aims and purposes of this aspect of the present invention.

Thus, low flow rates of high temperature heated air, high flow rates of lower temperature heated air, as well as high flow rates of high temperature heated air may be utilized versatilely under the fourth alternative according to the present invention for achieving selectively the desired result.

It will be appreciated that the foregoing specification and drawing are set forth by way of illustration and not limitation of the present invention, and that various changes and modifications may be made therein without departing from the spirit and scope of the present invention which is to be limited solely by the scope of the appended claims.

What is claimed is:

1. Method of using a composition consisting essentially of a water-compatible intimate and uniform fire retardant mixture substantially free from water-insoluble ingredients and from alkali and alkaline earths and having a substantially neutral pH in aqueous solution form and being substantially free from consitutents which are able to change such neutral pH to a basic pH, and containing in a ratio by weight substantially between about 30-50% monoammonium phosphate and 70-50% diammonium phosphate and at most up to about 2% free acid, said mixture being composed of finely divided particles in compacted solid pelletized dosage form and additionally containing an effective amount, of by weight substantially between about 0.05-0.3 part per part total monoammonium phosphate and diammonium phosphate, of a corrosion inhibitor or organic constitution provided in stable solution in a water system completely miscible with water and which is able to inhibit corrosion from both acid and basic constituents, for providing an improved composite fire retardant cellulosic product, said method comprising dissolving the compacted solid pelletized dosage form mixture in sufficient water to provide such mixture as a homogenous mixture in the form of an aqueous solution of substantially neutral pH containing in a 10 part ratio by weight substantially between about 3-7.9 parts total monoammonium phosphate and diammonium phosphate and 7-2.1 parts of water, and substantially intimately intermixing such aqueous solution with cellulosic fiber material in a 100 part ratio by weight of substantially between about 6-16 parts of such solution and 94-84 parts of such cellulosic fiber material and sufficiently to form loose fill fibers of such cellulosic material containing such solution substantially absorbed therein and having a settled bulk density of substantially between about 2.0-3.1 lbs/ft$^3$.

2. Method of claim 1 wherein the corrosion inhibitor is provided in the form of a light yellow oily liquid of specific gravity 1.08 and pH 8.2.

3. Method of claim 1 wherein the solid form mixture contains in a ratio by weight substantially between about 40-50% monoammonium phosphate and 60-50% diammonium phosphate, and is dissolved in sufficient water to provide such mixture in the form of an aqueous solution of substantially neutral pH containing in a 10 part ratio by weight substantially between about 3.8-5.7 parts total monoammonium phosphate and diammonium phosphate and 6.4-4.3 parts of water.

4. Method of using a composition consisting essentially of a water-compatible intimate and uniform fire retardant mixture substantially free from water-insoluble ingredients and from alkali and alkaline earths and having a substantially neutral pH in aqueous solution form and being substantially free from constituents which are able to change such neutral pH to a basic pH, and containing in a ratio by weight substantially between about 30-50% monoammonium phosphate and 70-50% diammonium phosphate and at most up to about 2% free acid, said mixture being composed of finely divided particles in compacted solid pelletized dosage form and additionally containing an effective amount, of by weight substantially between about 0.05-0.3 part per total monoammonium phosphate and diammonium phosphate, of a corrosion inhibitor of organic constitution provided in stable solution in a water system completely miscible with water and which is able to inhibit corrosion from both acid and basic constituents, for providing an improved composite fire retardant cellulosic product, said method comprising dissolving the compacted solid pelletized dosage form mixture in sufficient water to provide such mixture as a homogeneous mixture in the form of an aqueous solution of substantially netural pH containing in a 10 part ratio by weight substantially between about 3-7.9 parts total monoammonium phosphate and diammonium phosphate and 7-2.1 parts of water, and substantially intimately intermixing such aqueous solution with cellulosic fiber material, and adding an enriching additive amount of a finely divided solid supplemental fire retardant material during the intermixing, such that the solution, cellulosic fiber material and supplemental fire retardant material are intermixed in a 100 part ratio by weight of substantially between about 6-16 parts of such solution, 1-9 parts of such supplemental fire retardant material and 93-75 parts of such cellulosic fiber material, the intermixing being carried out sufficiently to form loose fill fibers of such cellulosic material containing such solution substantially absorbed therein and such supplemental fire retardant material substantially distributed thereon and having a settled bulk density of substantially between about 2.0-3.1 lbs/ft$^3$.

5. Method of claim 4 wherein the corrosion inhibitor is provided in the form of a light yellow oily liquid of specific gravity 1.08 and pH 8.2.

6. Method of claim 4 wherein the solid form mixture contains in a ratio by weight substantially between about 40–50% monoammonium phosphate and 60–50% diammonium phosphate, and is dissolved in sufficient water to provide such mixture in the form of an aqueous solution of substantially neutral pH containing in a 10 part ratio by weight substantially between about 3.8–5.7 parts total monoammonium phosphate and diammonium phosphate and 6.2–4.3 parts of water.

7. Method of using a composition consisting essentially of a water-compatible intimate and uniform fire retardant mixture substantially free from water-insoluble ingredients and from alkali and alkaline earths, and containing in a ratio by weight substantially between about 30–50% monoammonium phosphate and 70–50% diammonium phosphate and at most up to about 2% free acid, said mixture being a homogenous mixture in the form of an aqueous solution of substantially netural pH containing in a 10 part ratio by weight substantially between about 3–7.9 parts total monoammonium phosphate and diammonium phosphate and 7–2.1 parts of water and additionally containing an effective amount, of by weight substantially between about 0.05–0.3 part per part total monoammonium phosphate and diammonium phosphate, of a corrosion inhibitor of organic constitution provided in stable solution in a water system completely miscible with water and which is able to inhibit corrosion from both acid and basic constituents, for providing an improved composite fire retardant cellulosic product, said method comprising substantially intimately intermixing the solution with cellulosic fiber material in a 100 part ratio by weight of substantially between about 6–16 parts of such solution and 94–84 parts of such cellulosic fiber material and sufficiently to form loose fill fibers of such cellulosic material containing such solution substantially absorbed therein and having a settled bulk density of substantially between about 2.0–3.1 lbs/ft$^3$.

8. Method of claim 7 wherein the corrosion inhibitor is provided in the form of a light yellow oily liquid of specific gravity 1.08 and pH 8.2.

9. Method of claim 7 wherein the solution contains in a ratio by weight substantially between about 40–50% monoammonium phosphate and 60–50% diammonium phosphate, and in a 10 part ratio by weight substantially between about 3.8–5.7 parts total monoammonium phosphate and diammonium phosphate and 6.2–4.3 parts of water.

10. Method of using a composition consisting essentially of a water-compatible intimate and uniform fire retardant mixture substantially free from water-insoluble ingredients and from alkali and alkaline earths, and containing in a ratio by weight substantially between about 30–50% monoammonium phosphate and 70–50% diammonium phosphate and at most up to about 2% free acid, said mixture being a homogeneous mixture in the form of an aqueous solution of substantially netural pH containing in a 10 part ratio by weight substantially between about 3–7.9 parts total monoammonium phosphate and diammonium phosphate and 7–2.1 parts of water and additionally containing an effective amount, of by weight substantially between about 0.05–0.3 part per part total monoammonium phosphate and diammonium phosphate, of a corrosion inhibitor of organic constitution provided in stable solution in a water system completely miscible with water and which is able to inhibit corrosion from both acid and basic constituents, for providing an improved composite fire retardant cellulosic product, said method comprising substantially intimately intermixing the solution with cellulosic fiber material, and adding an enriching additive amount of a finely divided solid supplemental fire retardant material during the intermixing, such that the solution, cellulosic fiber and supplemental fire retardant material are intermixed in a 100 part ratio by weight of substantially between about 6–16 parts of such solution, 1–9 parts of such supplemental fire retardant material and 93–75 parts of such cellulosic fiber material, the intermixing being carried out sufficiently to form loose fill fibers of such cellulosic material containing such solution substantially absorbed therein and such supplemental fire retardant material substantially distributed thereon and having a settled bulk density of substantially between about 2.0–3.1 lbs/ft$^3$.

11. Method of claim 10 wherein the corrosion inhibitor is provided in the form of a light yellow oily liquid of specific gravity 1.08 and pH 8.2.

12. Method of claim 10 wherein the solution contains in a ratio by weight substantially between about 40–50% monoammonium phosphate and 60–50% diammonium phosphate, and in a 10 part ratio by weight substantially between about 3.8–5.7 parts total monoammonium phosphate and diammonium phosphate and 6.2–4.3 parts of water.

13. Method for providing an improved composite fire retardant cellulosic product comprising substantially intimately intermixing an aqueous solution of substantially neutral pH and containing in a ratio by weight substantially between about 30–50% monoammonium phosphate and 70–50% diammonium phosphate, and having a concentration of from about 30% by weight up to a saturated solution and additionally containing an effective amount, of by weight substantially between about 0.05–0.3 part per part total monoammonium phosphate and diammonium phosphate, of a corrosion inhibitor of organic constitution provided in stable solution in a water system completely miscible with water and which is able to inhibit corrosion from both acid and basic constituents, with cellulosic fiber material in a 100 part ratio by weight of substantially between about 6–16 parts of such solution and 94–84 parts of such cellulosic fiber material and sufficiently to form loose fill fibers of such cellulosic material containing such solution substantially absorbed therein and having a settled bulk density of substantially between about 2.0–3.1 lbs/ft$^3$.

14. Method of claim 13 wherein the corrosion inhibitor is provided in the form of a light yellow oily liquid of specific gravity 1.08 and pH 8.2.

15. Method of claim 13 wherein the solution contains an effective amount of a surfactant.

16. Method of claim 13 wherein the solution contains in a ratio by weight substantially between about 40–50% monoammonium phosphate and 60–50% diammonium phosphate, and in a 10 part ratio by weight substantially between about 3.8–5.7 parts total monoammonium phosphate and diammonium phosphate and 6.2–4.3 parts of water.

17. Method of claim 13 wherein the intermixing includes pulverizing the cellulosic fiber material in contact with the solution.

18. Method of claim 17 wherein the intermixing is carried out at least in part in the presence of a hot air current sufficient for removing attendant moisture corresponding to a portion of the water content of the solution present.

19. Method for providing an improved composite fire retardant cellulosic product comprising substantially intimately intermixing an aqueous solution of substantially neutral pH and containing in a ratio by weight substantially between about 30-50% monoammonium phosphate and 70-50% diammonium phosphate, and having a concentration of from about 30% by weight up to a saturated solution and additionally containing an effective amount, of by weight substantially between about 0.05-0.3 part per part total monoammomium phosphate and diammonium phosphate, of a corrosion inhibitor of organic constitution provided in stable solution in a water system completely miscible with water and which is able to inhibit corrosion from both acid and basic constituents, with cellulosic fiber material, and adding an enriching additive amount of a finely divided solid supplemental fire retardant material during the intermixing, such that the solution, cellulosic fiber material and supplemental fire retardant material are intermixed in a 100 part ratio by weight of substantially between about 6-16 parts of such solution, 1-9 parts of such supplemental fire retardant material and 93-75 parts of such cellulosic fiber material, the intermixing being carried out sufficiently to form loose fill fibers of such cellulosic material containing such solution substantially absorbed therein and such supplemental fire retardant material substantially distributed thereon and having a settled bulk density of substantially between about 2.0-3.1 lbs/ft$^3$.

20. Method of claim 19 wherein the corrosion inhibitor is provided in the form of a light yellow oily liquid of specific gravity 1.08 and pH 8.2.

21. Method of claim 19 wherein the solution contains an effective amount of a surfactant.

22. Method of claim 19 wherein the solution contains in a ratio by weight substantially between about 40-50% monoammonium phosphate and 60-50% diammonium phosphate, and in a 10 part ratio by weight substantially between about 3.8-5.7 parts total monoammonium phosphate and diammonium phosphate and 6.2-4.3 parts of water.

23. Method of claim 19 wherein the intermixing includes pulverizing the cellulosic fiber material in contact with the solution and at least in part in contact with the supplemental fire retardant material.

24. Method of claim 23 wherein the intermixing is carried out at least in part in the presence of a hot air current sufficient for removing attendant moisture corresponding to a portion of the water content of the solution present.

25. Method for providing an improved composite fire retardant cellulosic product comprising substantially intimately intermixing an aqueous solution of substantially neutral pH and containing in a ratio by weight substantially between about 30-50% monoammonium phosphate and 70-50% diammonium phosphate, and having a concentration of from about 30% by weight up to a saturated solution and additonally containing an effective amount, of by weight substantially between about 0.05-0.3 part per part total monoammonium phosphate and diammonium phosphate, of a corrosion inhibitor provided in stable solution in a water system completely miscible with water and which is able to inhibit corrosion from both acid and basic constituents, with cellulosic fiber material, and optionally adding an enriching amount of a finely divided solid supplemental fire retardant material during the intermixing, such that where the solution and cellulosic fiber material are present in the absence of the supplemental fire retardant material they are intermixed in a 100 part ratio by weight of substantially between about 6-16 parts of such solution and 94-84 parts of such cellulosic fiber material and sufficiently to form loose fill fibers of such cellulosic material containing such solution substantially absorbed therein and having a settled bulk density of substantially between about 2.0-3.1 lbs/ft$^3$, and such that where the solution and cellulosic fiber material are present in the presence of the supplemental fire retardant material they are intermixed in a 100 part ratio by weight of substantially between about 6-16 parts of such solution, 1-9 parts of such supplemental fire retardant material and 93-75 parts of such cellulosic fiber material and sufficiently to form loose fill fibers of such cellulosic material containing such solution substantially absorbed therein and such supplemental fire retardant material substantially distributed thereon and having said settled bulk density.

26. Method of claim 25 wherein the solution contains in a ratio by weight substantially between about 40-50% monoammonium phosphate and 60-50% diammonium phosphate, and in a 10 part ratio by weight substantially between about 3.8-5.7 parts total monoammonium phosphate and diammonium phosphate and 6.2-4.3 parts of water.

27. Method of claim 25 wherein said supplemental fire retardant material is present and constitutes an alkaline reacting corrosive constituent containing material.

* * * * *